(12) United States Patent
Peterson et al.

(10) Patent No.: US 10,968,910 B2
(45) Date of Patent: Apr. 6, 2021

(54) INLET PORT CONFIGURATION FOR ROOTS-TYPE SUPERCHARGER

(71) Applicant: Magnuson Products, LLC, Ventura, CA (US)

(72) Inventors: Owen Peterson, Ventura, CA (US); Jonathan Thomas, Ventura, CA (US)

(73) Assignee: Magnuson Products, LLC, Ventura, CA (US)

( * ) Notice: Subject to any disclaimer, the term of this patent is extended or adjusted under 35 U.S.C. 154(b) by 0 days.

(21) Appl. No.: 16/465,738

(22) PCT Filed: Jul. 27, 2018

(86) PCT No.: PCT/US2018/044231
§ 371 (c)(1),
(2) Date: May 31, 2019

(87) PCT Pub. No.: WO2019/027844
PCT Pub. Date: Feb. 7, 2019

(65) Prior Publication Data
US 2020/0080558 A1 Mar. 12, 2020

Related U.S. Application Data

(60) Provisional application No. 62/539,004, filed on Jul. 31, 2017.

(51) Int. Cl.
*F04C 18/16* (2006.01)
*F02B 33/38* (2006.01)
(Continued)

(52) U.S. Cl.
CPC .............. *F04C 18/16* (2013.01); *F02B 33/38* (2013.01); *F04C 18/126* (2013.01); *F04C 29/12* (2013.01);
(Continued)

(58) Field of Classification Search
CPC ........ F02B 33/38; F04C 18/16; F04C 27/007; F04C 28/10; F04C 29/12; F04C 18/126;
(Continued)

(56) References Cited

U.S. PATENT DOCUMENTS 7,488,164 B2  2/2009  Swartzlander
7,886,966 B1  2/2011  Fox et al.
(Continued)

FOREIGN PATENT DOCUMENTS

WO  2013152112 A1  10/2013
WO  2017156236 A1  9/2017

*Primary Examiner* — Brandon D Lee

(57) ABSTRACT

A supercharger having twisted meshing rotors sealingly contained within a housing having an inlet port to admit air into the meshing rotors and an outlet port to expel air from the meshing rotors, the rotors having mesh points where the rotors contact one another and spaces between their mesh points to accept air from the inlet port and propel it to the outlet port as the rotors are rotated and the mesh points travel axially, the housing, inlet and rotors defining an angle known as the seal transfer angle which is greater than or equal to zero degrees when the inlet port is closed and the volume of air between rotors is sealed and has no leakage path. In the described supercharger the housing, rotors and inlet port are configured to have a negative seal transfer angle of, e.g., −10 to −40 degrees or more, up to the maximum available, and to provide a leakage path for an angular portion of the rotors' rotation, improving high end performance without degrading low end performance.

20 Claims, 23 Drawing Sheets

(51) Int. Cl.
 *F04C 18/12* (2006.01)
 *F04C 29/12* (2006.01)
(52) U.S. Cl.
 CPC ...... *F04C 2240/20* (2013.01); *F04C 2240/30* (2013.01)
(58) Field of Classification Search
 CPC .............. F04C 2240/20; F04C 2240/30; F04C 2250/20
 See application file for complete search history.

(56) References Cited

U.S. PATENT DOCUMENTS

| | | |
|---|---|---|
| 8,632,324 B2 | 1/2014 | Swartzlander |
| 2006/0263230 A1 | 11/2006 | Swartzlander |
| 2008/0193315 A1 | 7/2008 | Masaki et al. |
| 2017/0067464 A1* | 3/2017 | Swartzlander .......... F04C 18/16 |
| 2019/0113035 A1* | 4/2019 | Swartzlander .......... F04C 18/18 |

* cited by examiner

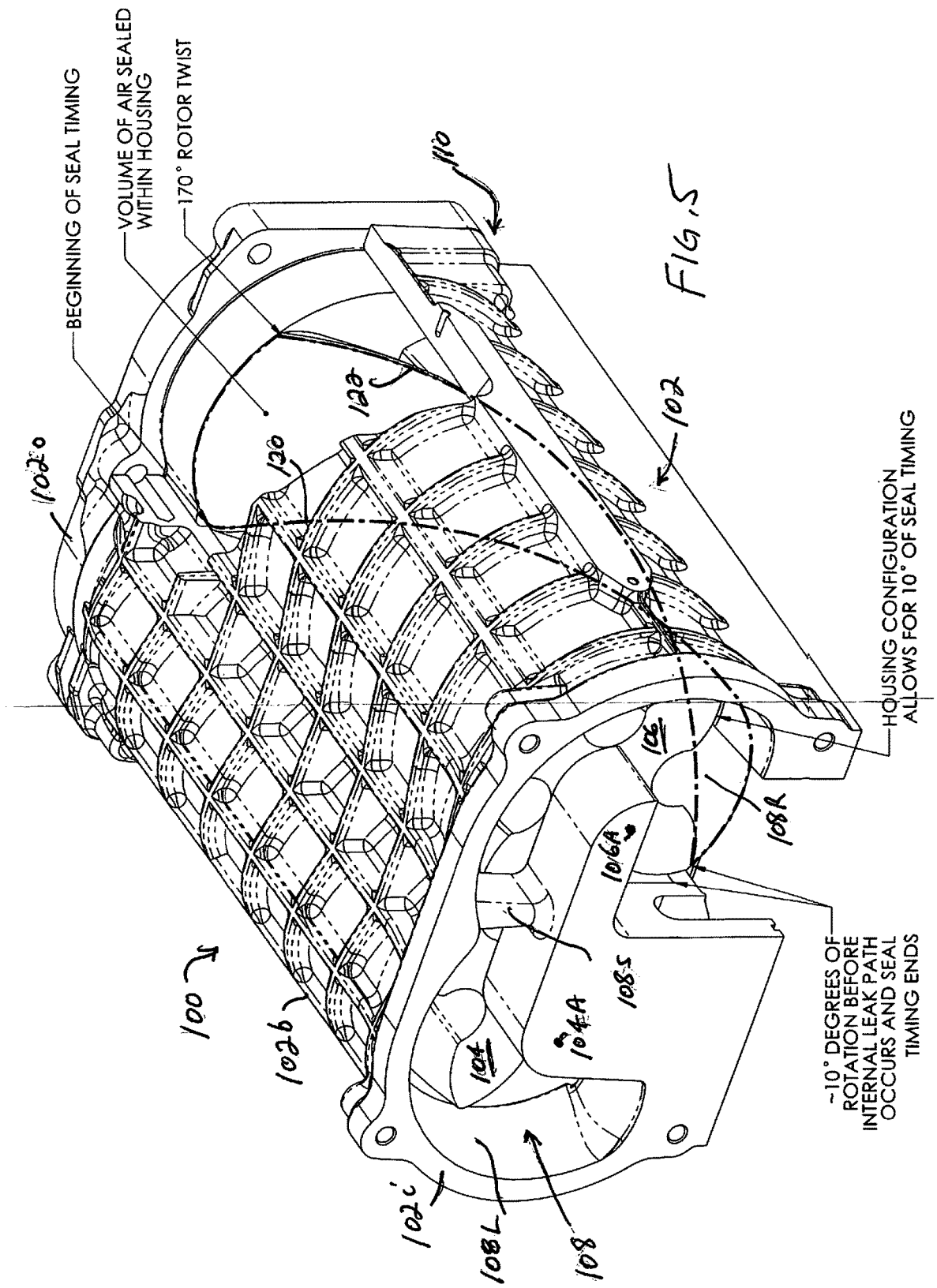

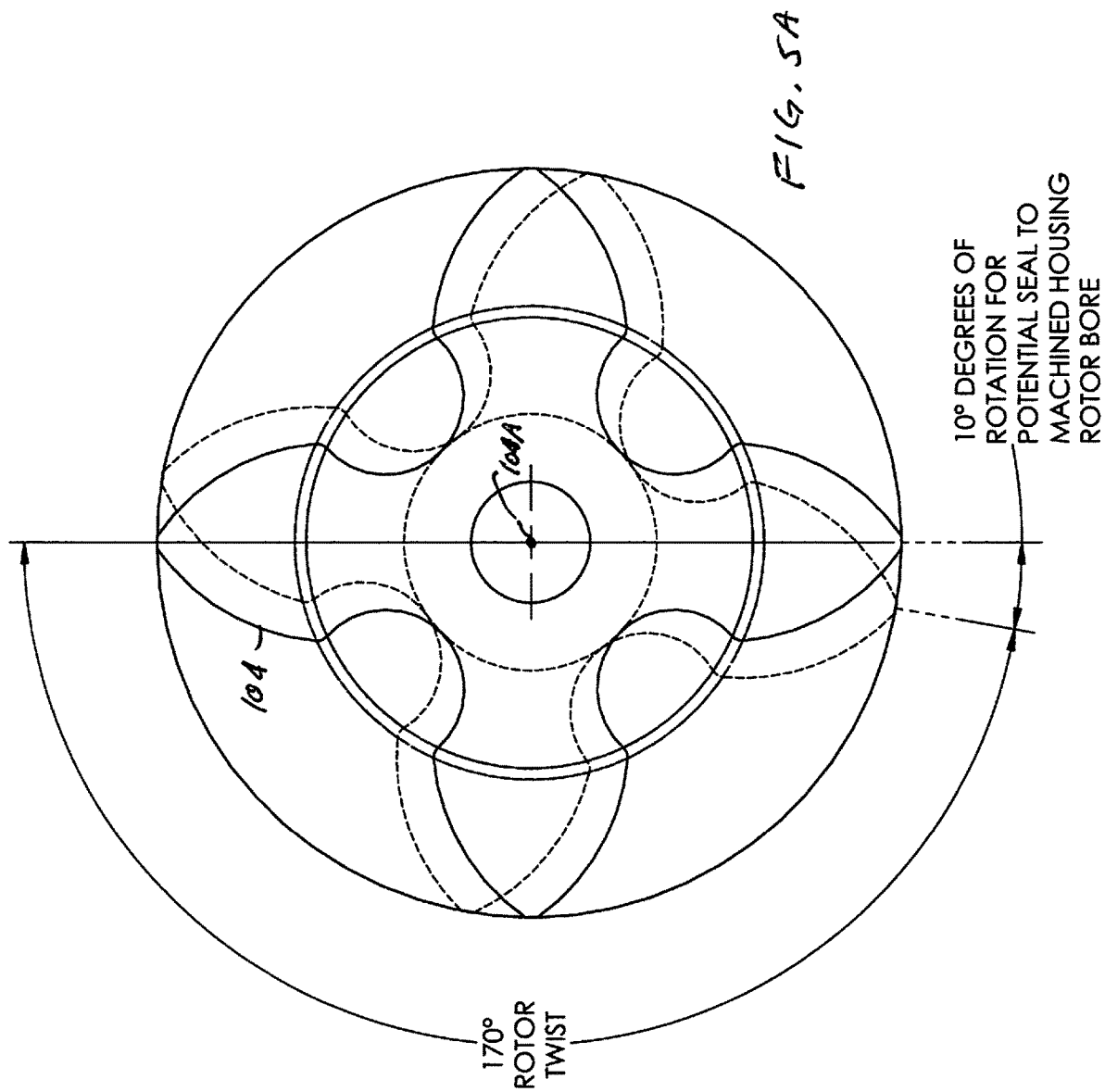

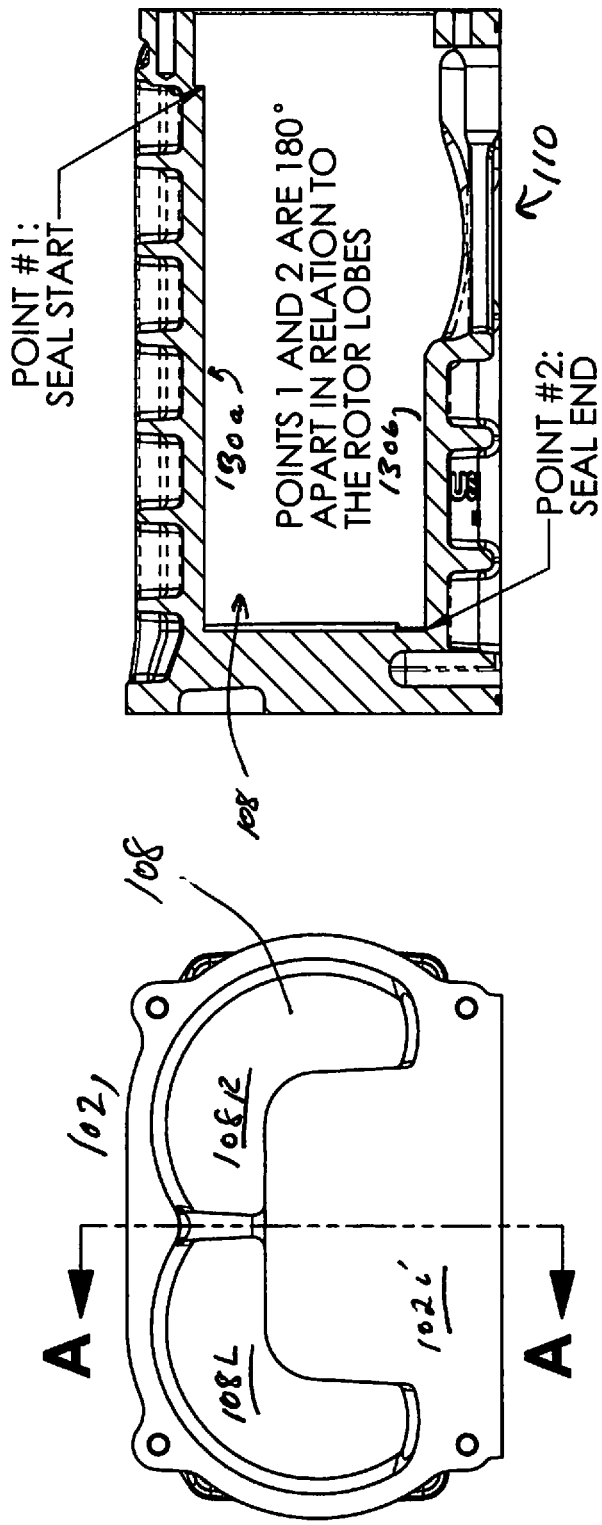

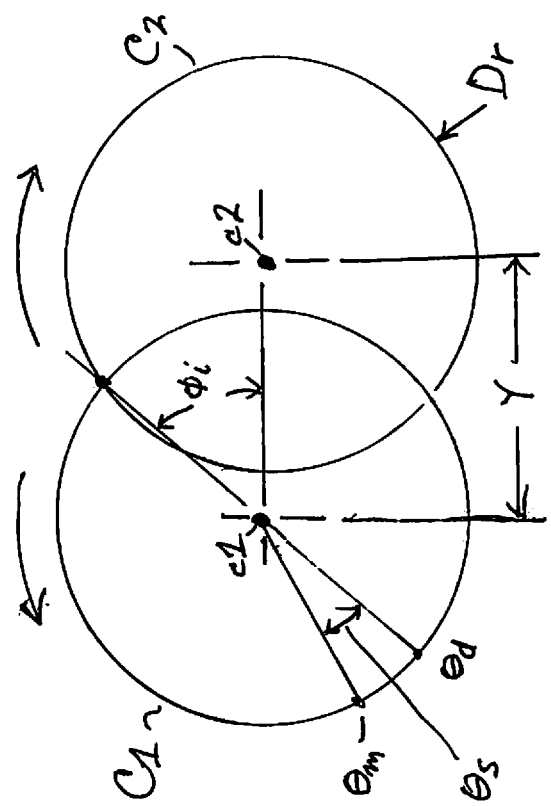

TEST #1: 10° SEAL / 0° DWELL

TEST #2: 0° SEAL / 10° DWELL

TEST #3: -10° SEAL / 20° DWELL

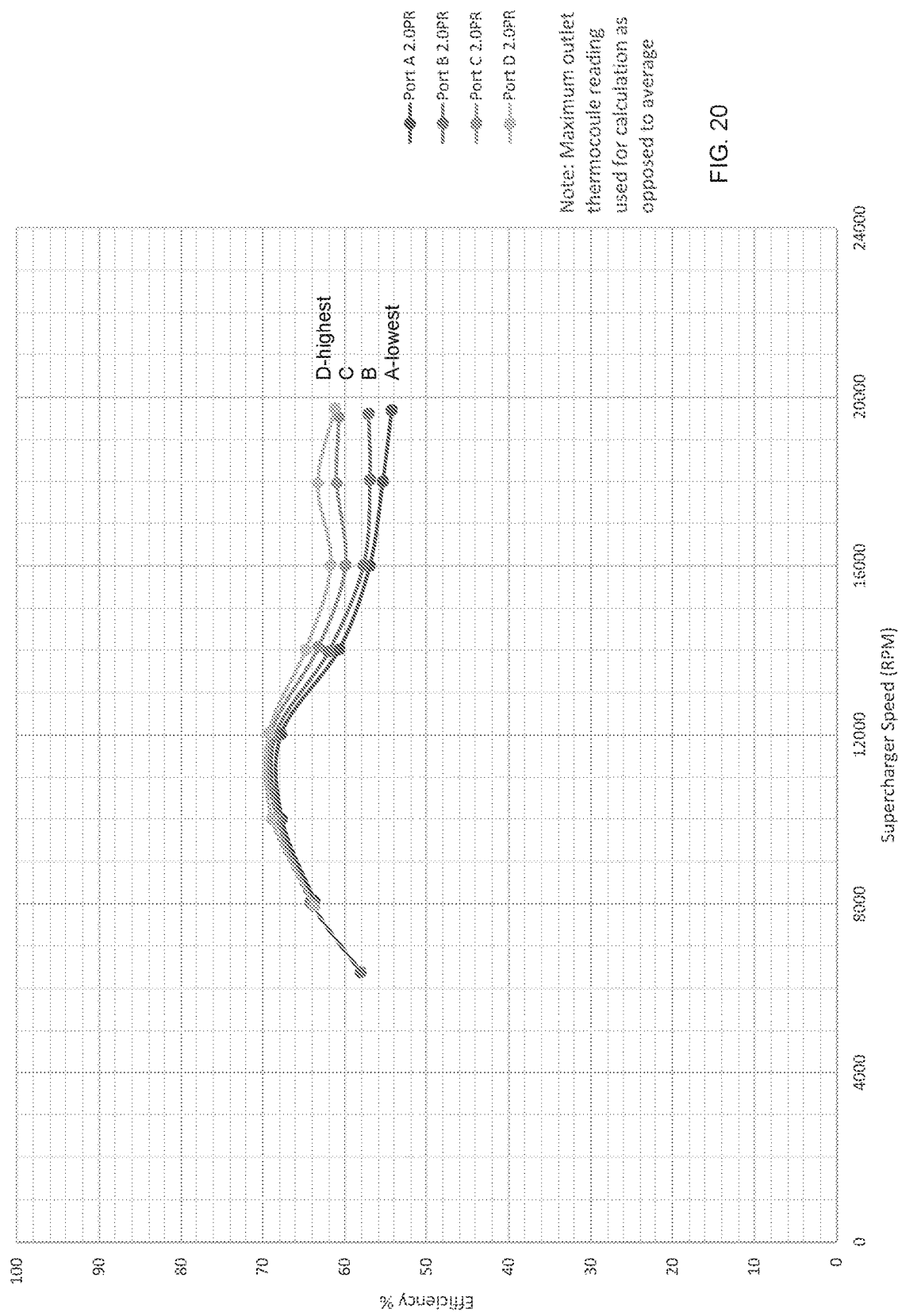

INLET PORT CONFIGURATION FOR ROOTS-TYPE SUPERCHARGER

PRIORITY

This application claims priority to U.S. provisional patent application 62/539,004 filed Jul. 31, 2017, incorporated herein by reference, and to PCT US patent application PCT/US2018/044231 filed Jul. 27, 2018, incorporated herein by reference.

FIELD OF THE INVENTION

This invention relates to superchargers using meshing twisted rotors to pump quantities of air, typically to an internal combustion engine, to provide enhanced performance.

BACKGROUND OF THE INVENTION

Superchargers, known also as blowers, use a variety of techniques to magnify airflow to an engine and to generate increased power and torque. Performance enthusiasts use superchargers to provide increased acceleration and speed, and automotive OEMs use superchargers to permit smaller displacement engines, with reduced fuel consumption, to be used to meet mileage goals but to also enable increased performance on demand when needed for safe passing and hill climbing. As a supercharger is itself a performance-enhancing device, any improvements to supercharger designs that further enhance performance are desirable.

One type of supercharger, a Roots-type supercharger, uses a pair of twisted meshing rotors mounted in a housing and driven from an engine crankshaft to propel air from an intake port to an output port. The increased volume of air provides a pressure increase, or boost, within an engine's combustion chamber and a more forceful detonation of the fuel-air mixture introduced there. An example of this type of supercharger is disclosed, for example, in U.S. Pat. Nos. 7,488,164, 7,886,966 and 8,632,324 issued to Eaton Corporation, a manufacturer of rotors and superchargers.

FIGS. 1-4, reproduced from U.S. Pat. No. 8,632,324, illustrate the prior art supercharger of the referenced patents, which is supplied as background to help understand the context of the present invention. Referring to the prior art drawings FIGS. 1-4, FIG. 1 is an external, perspective view of a Roots-type blower, generally designated 11 that includes a blower housing 13. The illustrated blower 11 is of the rear inlet, radial outlet type and therefore, the mechanical input to drive the blower rotors is by means of a pulley 15, which would be disposed toward the forward end of the engine compartment. Toward the "lower" end of the view in FIG. 1, the blower housing 13 defines an inlet port, generally designated 17. The blower housing 13 also defines an outlet port, generally designated 19 which, as may best be seen in FIG. 1, is generally triangular including an end surface 21 which is generally perpendicular to an axis A (see FIG. 2) of the blower 11, and a pair of side surfaces 23 and 25. It is a requirement in such a blower that the inlet port be configured such that the inlet seal time be at least equal to the amount of the rotor lobe twist angle. Therefore, the greater the twist angle, the greater the inlet port "extent" (in rotational degrees), when the outside of the port is "constrained" by the outside diameter of the rotor bores. The inlet seal time must be at least equal to the twist angle to insure that the transfer volume is fully out of mesh prior to closing off communication of this volume to the inlet port.

Referring now to FIGS. 2 and 3, the blower housing 13 defines a pair of transversely overlapping cylindrical chambers 27 and 29, such that in FIG. 2, the view is from the chamber 27 into the chamber 29. In FIG. 3, the chamber 29 is the right hand chamber, FIG. 3 being a view taken from the rearward end (right end in FIG. 2) of the rotor chamber, i.e., looking forwardly in the engine compartment. The blower chambers 27 and 29 overlap at an inlet cusp 30a (which is in-line with the inlet port 17), and overlap at an outlet cusp 30b (which is in-line with, and actually is interrupted by the outlet port 19). Referring now primarily to FIG. 2, the blower housing 13 defines a first end wall 31 through which passes the inlet port 17, and therefore, for purposes of subsequent description and the appended claims, the first end wall 31 is referenced as "defining" the inlet port 17. At the forward end of the chambers 27 and 29, the blower housing 13 defines a second end wall 33 which separates the cylindrical rotor chambers 27 and 29 from a gear chamber 35 which, as is well known to those skilled in the art, contains the timing gears, one of which is shown partially broken away and designated TG. The construction and function of the timing gears is well known to those skilled in the art.

Referring now primarily to FIG. 3, but also to FIG. 4, it may be seen that disposed within the rotor chamber 27 is a rotor generally designated 37, and disposed within the rotor chamber 29 is a rotor, generally designated 39. The rotor 37 is fixed relative to a rotor shaft 41 and the rotor 39 is fixed relative to a rotor shaft 43. The general construction of Roots-type blower rotors, and the manner of mounting them on the rotor shafts is generally well known to those skilled in the art. Those skilled in the art will recognize that there are a number of different methods known and available for forming blower rotors, and for thereafter fixedly mounting such rotors on their rotor shafts.

Each of the rotors 37 and 39 has a plurality N of lobes, the rotor 37 having lobes generally designated 47 and the rotor 39 having lobes generally designated 49. In the illustrated embodiment the plurality N is illustrated to be equal to 4, such that the rotor 47 includes lobes 47a, 47b, 47c, and 47d. In the same manner, the rotor 39 includes lobes 49, 49a, 49b, 49c, and 49d. The lobes 47 have axially facing end surfaces 47s1 and 47s2, while the lobes 49 have axially facing end surfaces 49s1 and 49s2. It should be noted that in FIG. 4, the end surfaces 47s1 and 49s1 are actually visible, whereas for the end surfaces 47s2 and 49s2, the lead lines merely "lead to" the ends of the lobes because the end surfaces are not visible in FIG. 4. The end surfaces 47s1 and 49s1 sealingly cooperate with the first end wall 31, while the end surfaces 47s2 and 49s2 sealingly cooperate with the second end wall 33, in a manner well known to those skilled in the art.

As is well known to those skilled in the Roots-type blower art, when viewing the rotors from the inlet end as in FIG. 3, the left hand rotor 37 rotates clockwise, while the right hand rotor 39 rotates counterclockwise. Therefore, air which flows into the rotor chambers 27 and 29 through the inlet port 17 will flow into, for example, a control volume defined between the lobes 47a and 47b, or between the lobes 49a and 49b, and the air contained in those control volumes will be carried by their respective lobes, and in their respective directions around the chambers 27 and 29, respectively, until those particular control volumes are in communication with the outlet port 19. Each of the lobes 47 includes a top land 47t, and each of the lobes 49 includes a top land 49t, the top lands 47t and 49t sealingly cooperating with the cylindrical chambers 27 and 29, respectively, as is also well known in the art.

The term "control volume" refers, primarily, to the region or volume between two adjacent unmeshed lobes, after the trailing lobe has traversed the inlet cusp, and before the leading lobe has traversed the outlet cusp. However, it will be understood by those skilled in the art that the region between two adjacent lobes (e.g., lobes 47d and 47a) also passes through the rotor mesh, as the lobe 49d is shown in mesh between the lobes 47d and 47a in FIG. 3. Each region, or control volume, passes through the four phases of operation, i.e., the inlet phase; the transfer phase; the backflow phase; and the outlet phase.

There are four phases of operation of a Roots-type blower, and for each phase there is an associated seal time as follows: (1) the "inlet seal time" is the number of degrees of rotation during which the control volume is exposed to the inlet port; (2) the "transfer seal time" is the number of degrees of rotation during which the transfer volume is sealed from both the inlet "event" and the backflow "event"; (3) the "backflow seal time" is the number of degrees during which the transfer volume is open to the "backflow" port (as that term will be defined later), prior to discharging to the outlet port; and (4) the "outlet seal time" is the number of degrees during which the transfer volume is exposed to the outlet port.

Therefore, viewing FIG. 3, the control volume between the lobes 47a and 47b (and between lobes 49a and 49b) comprises the inlet phase, as does the control volume between the lobes 47b and 47c. The control volume between the lobes 47c and 47d is in the transfer phase, just prior to the backflow phase. As soon as the lobe 47d passes the outlet cusp 30b in FIG. 3, the control volume between it and the lobe 47c will be exposed to the backflow phase. Once the lobe 47d passes the outlet cusp 30, at the plane of the inlet port (FIG. 3), the control volume is exposed to the outlet pressure through a "blowhole". As stated in this prior art patent, "To insure that there is not a leak back to the inlet port 17, the control volume between lobes 47c and 47d must be completely out of communication with the inlet port, i.e., must be out of the inlet phase. With the lobe 47d being the "leading" lobe, and the lobe 47c being the "trailing" lobe of the control volume, the trailing lobe 47c must still be sealed to the chamber 27 at the peak of the inlet cusp 30a, when the leading lobe 47d is still sealed to the outlet cusp 30b, as shown in FIG. 3." The above requirement indicates the maximum amount of seal time for the inlet seal time and the transfer seal time, together, which will be significant in determining the maximum, ideal twist angle subsequently.

The followings summarizes the prior art supercharger depicted in FIGS. 1-4:

As described in these prior art patents, the meshed, lobed rotors each include a plurality of lobes and each lobe has axially facing end surfaces that define a twist angle, and each lobe defines a helix angle. According to the prior art patents rotors can be designed with a maximum ideal twist angle for the lobe as a function of the number of lobes, with a helix angle for each lobe as a function of the maximum ideal twist angle and the axial length between the end surfaces of the lobe.

As further described in these prior art patents, the rotors are in a housing having overlapping cylindrical chambers, a first end wall with an inlet port and an outlet port adjacent a second end wall. The rotor ends sealingly engage the housing end walls, and the lobes of the meshing rotors sealingly engage each other at mesh points, and have lands sealingly engaging the interior surfaces of the cylindrical chambers to define, as they rotate, a linearly propelled control volume of fluid (air) having an inlet seal time, a transfer seal time, and a total seal time that is the sum of the inlet and transfer seal times. As noted for example in prior art U.S. Pat. No. 8,632,324 "One of the important aspects of the present invention relates to a Roots blower parameter know as the "seal time" wherein the reference to "time" is a misnomer, as the term actually is referring to an angular measurement (i.e., in rotational degrees). Therefore, "seal time" refers to the number of degrees that a rotor lobe (or a control volume) travels in moving from through a particular 'phase' of operation, as the various phases will be described hereinafter."

According to the prior art patents the maximum ideal twist angle is the largest possible twist angle for each rotor lobe without opening a leak path to the inlet port so that when the twist angle is a maximum ideal twist angle, the total seal time is a total maximum seal time and the transfer seal time is zero, and when the twist angle is less than the maximum ideal twist angle, the total seal time is a total optimized seal time and the transfer seal time is greater than zero, but the total maximum seal time and the total optimized seal time are substantially constant.

Prior art U.S. Pat. No. 8,632,324 further describes an arrangement in which the lobes cooperate with an adjacent surface of the housing to define at least one backflow passage or blowhole that defines a control volume, occurs in a cyclic manner, and moves linearly in a direction toward the outlet port and provides communication between adjacent control volumes. While such a backflow passage permits airflow or leakage between adjacent control volumes to equalize pressures in the control volumes, the desired maximum ideal twist angle does not open a leak path to the inlet port.

While several strategies have been developed to improve the performance of meshing rotor superchargers in the prior art, it is currently necessary to resort to a larger volume supercharger in order to provide better performance results, and because of space limitations (e.g., under a vehicle hood) there remains a need to further improve supercharger designs, and for a given supercharger size, to provide greater performance results.

SUMMARY OF THE INVENTION

Briefly, the present invention provides a supercharger with meshing rotors sealingly contained in a housing providing an inlet port and an outlet port and defining, as they rotate, a transfer seal time (or angle of rotation) during which the inlet port is closed and the volume of air between rotors is sealed against leakage. What the present inventors have discovered is that performance enhancements can be achieved by providing a negative transfer seal time or angle of rotation, and by intentionally utilizing a leakage path in contravention of conventional prior art thinking and practice. Test data have provided an unexpected result, namely that providing a negative seal transfer angle and positive leakage path produces increased flow rate, increased volumetric efficiency, and increased isentropic efficiency at higher supercharger speeds (rotor rpm) without the anticipated corresponding deterioration of performance at lower supercharger (rotor rpm) speeds. These performance improvements continue to be observed as supercharger boost increases.

In one aspect, the invention is a supercharger with meshing rotors sealingly contained in a housing providing an inlet port and an outlet port and defining an transfer seal time corresponding to an angle of rotation, wherein the transfer seal angle is negative and a leakage path is created between the inlet port and space between rotors.

In another aspect, the invention is a supercharger with meshing rotors sealingly contained in a housing providing an inlet port and an outlet port and defining a transfer seal time corresponding to an angle of rotation, wherein the transfer seal angle is at least −10 degrees.

In another aspect, the invention is a supercharger with meshing rotors sealingly contained in a housing providing an inlet port and an outlet port and defining a transfer seal time corresponding to an angle of rotation, wherein the transfer seal angle is at least −40 degrees.

In another aspect, the invention is a supercharger with meshing rotors sealingly contained in a housing providing an inlet port and an outlet port and defining an transfer seal time corresponding to an angle of rotation, wherein the inlet port has an arcuate shape that extends circumferentially about the axes of the rotors and provides an opening that corresponds to transfer seal angle of at least −10 degrees and preferably more than −40 degrees.

In a preferred embodiment of the invention, a supercharger has twisted meshing rotors with their outer surfaces in sealing contact with a housing and their ends in sealing contact with an inlet wall and an outlet wall, the inlet wall having an inlet port to admit air into the meshing rotors and the housing having an outlet port to expel air from the meshing rotors, the rotors having mesh points where the rotors contact one another and spaces between their mesh points to accept air from the inlet port and propel it to the outlet port as the rotors are rotated and the mesh points travel axially from the inlet to the outlet, the inlet port having an arcuate configuration around the circumferences of the axes of the rotors and the inlet and outlet ports being related to the rotor twist and length and to the location of the inlet and outlet ports and the inlet port extending a circumferential extent to have the inlet plate seal the spaces between the rotors during an angular portion of the rotors, wherein the rotors and inlet port are configured to prevent the housing from sealing the spaces between the rotors and to produce a negative seal transfer angle and a leakage path for an angular portion of the rotors' rotation.

In another aspect of the invention, the supercharger of the present invention is produced through the process of modifying a standard supercharger structure to enlarge the inlet port, e.g., by machining the housing end plate that defines the inlet port to increase the size of the inlet port, and thus inexpensively and quickly is able to overcome performance limitations of the prior art supercharger systems described with reference to prior art FIGS. 1-4. The described supercharger system is one that substantially improves the performance of a supercharger of a given size without substantial drawbacks.

In another aspect of the invention, a supercharger mounted on an engine produces improved high speed performance without degrading low speed performance by providing an inlet port with a size increased beyond the size of an inlet port that would produce a zero seal transfer angle, the increased size of the inlet port preventing the volume of air between rotors from being sealed, and using the engine to rotate the rotors to provide air flow through the supercharger that is increased over the air flow produced by a supercharger with an inlet port that would produce a zero sealing angle These and other objects, advantages and features of the invention are set forth in the attached description.

DESCRIPTION OF THE DRAWINGS

a. FIG. 1 is a perspective view of a prior art Roots-type blower showing both the inlet port and the outlet port.

b. FIG. 2 is an axial cross-section of the housing of the blower shown in perspective view in FIG. 1, but with the rotors removed for ease of illustration.

c. FIG. 3 is a somewhat diagrammatic view corresponding to a transverse cross-section through the blower, illustrating the overlapping rotor chambers and the rotor lobes.

d. FIG. 4 is a top mostly plan view of the rotor set shown diagrammatically in FIG. 3, and illustrating the helix angle of the lobes.

FIG. 5 is a perspective view showing a supercharger with a standard seal timing arrangement.

FIGS. 5A, 5B, 5C and 5D illustrate the relationship of rotor twist, rotor rotation and seal time within a housing in sealing contact with a rotor. FIG. 5A shows an end view of a rotor, FIG. 5B shows an end view of a rotor housing without a rotor, FIG. 5C shows a section on line A-A of FIG. 5B, and FIG. 5D is a schematic diagram illustrating rotor geometry.

FIG. 6 shows the standard 10 degrees seal, 0 degrees dwell.

FIG. 7 shows 0 degrees seal, 10 degrees dwell.

FIG. 8 shows −10 degrees seal, 20 degrees dwell.

FIG. 9 shows −20 degrees seal, 30 degrees dwell.

FIG. 10 shows −30 degrees seal, 40 degrees dwell.

FIG. 11 shows −40 degrees seal, 50 degrees dwell.

FIGS. 12-20 show test results for inlet flow rate, volumetric efficiency and isentropic efficiency for three different pressure ratios for four different sealing angles.

FIGS. 12-14 show test results for a pressure ratio of 1.6.

FIGS. 15-17 show test results for a pressure ratio of 1.8.

FIGS. 18-20 show test results for a pressure ratio of 2.0.

DETAILED DESCRIPTION OF THE INVENTION

Figure 1:
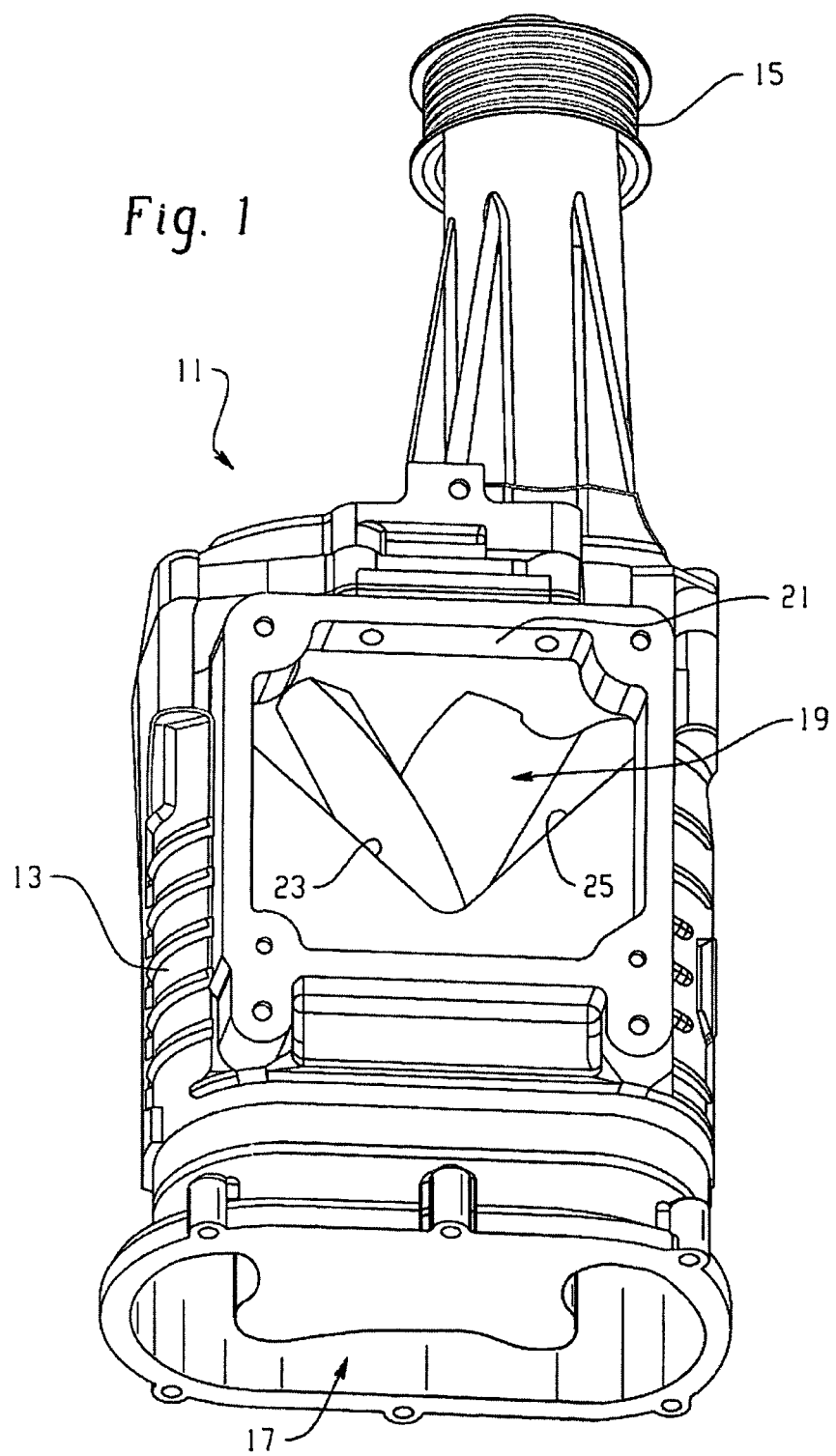
FIGS. 1-4 illustrate a prior art supercharger.
Figure 2:
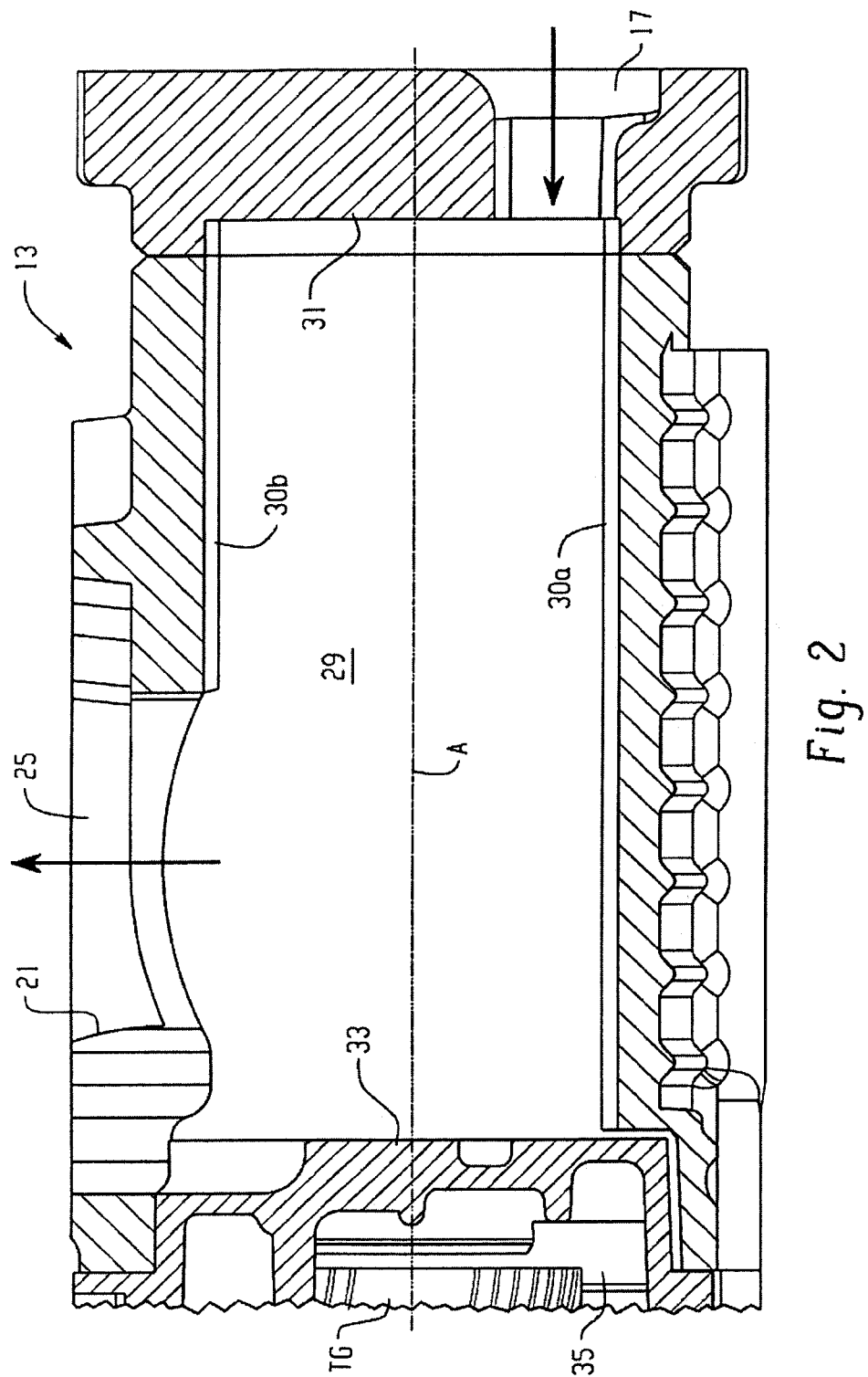
Figure 3:
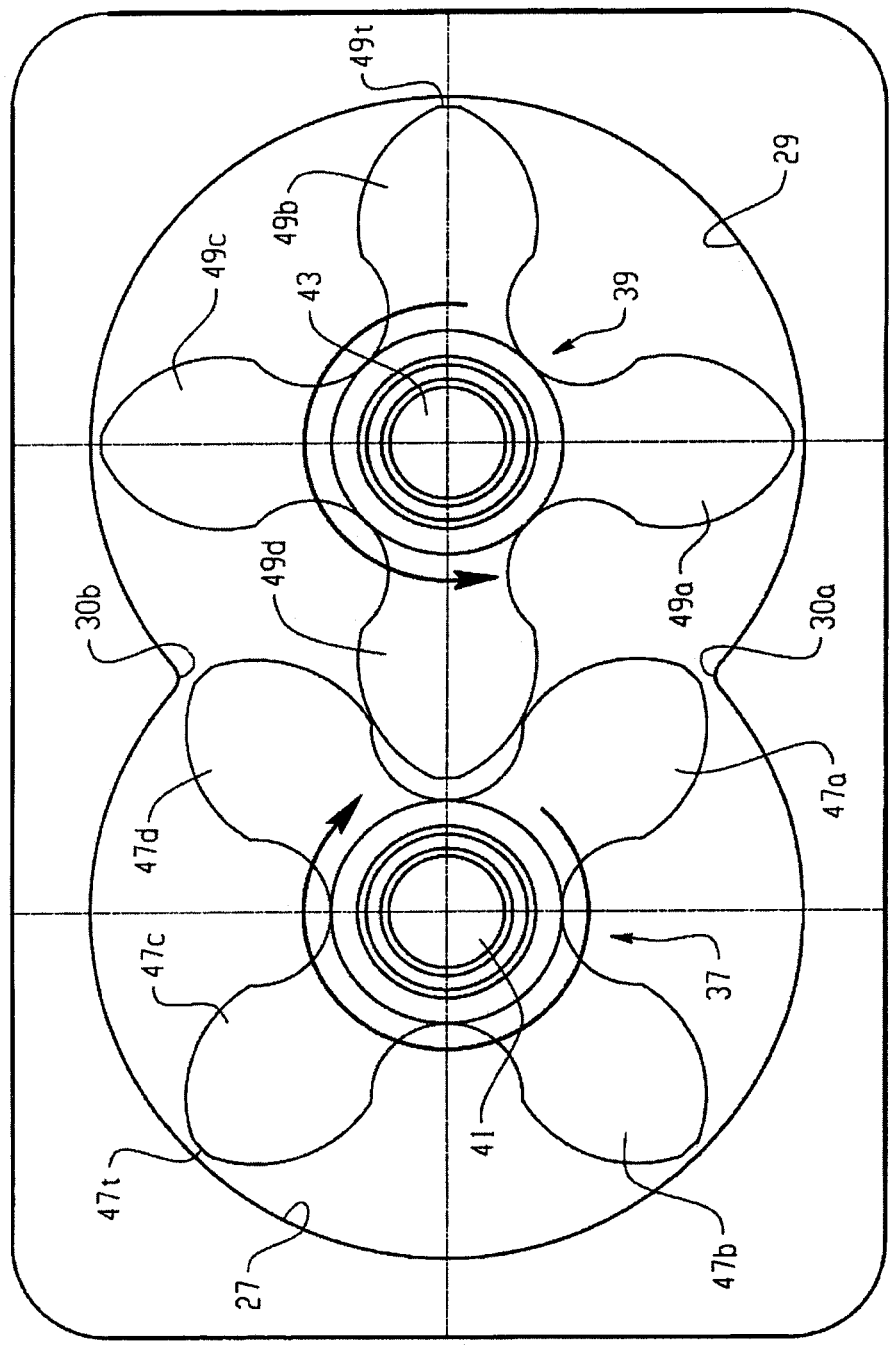
Figure 4:
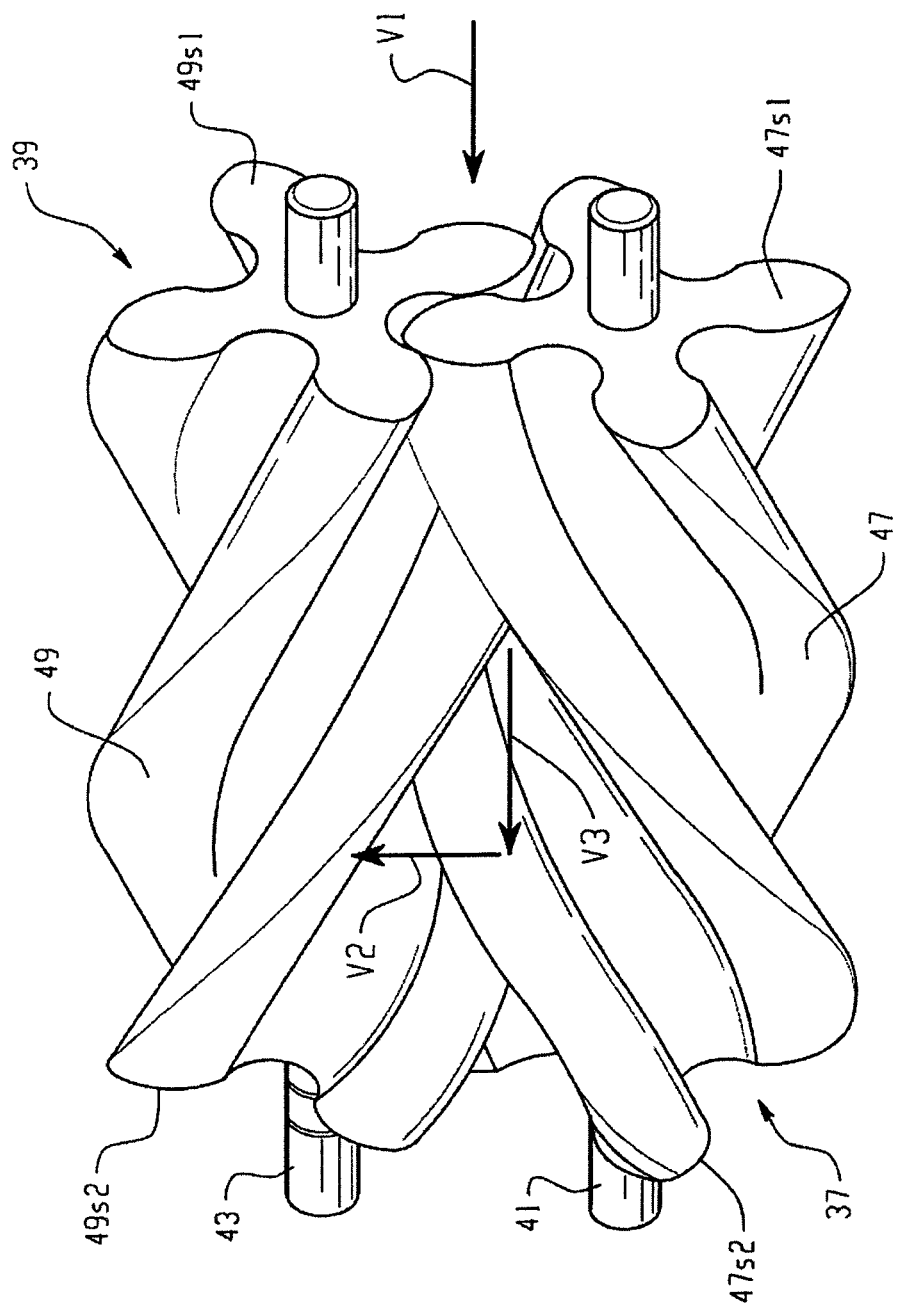

FIG. 5 is a perspective view of a supercharger 100, having a housing 102 with a body 102b and end walls or plates 102i and 102o, meshing rotors 104, 106 mounted in housing 102 in sealing contact with the body 102b and end plates 102i and 102o. Air enters the supercharger 100 through an inlet port 108 in end plate 102i and exits through an outlet port 110 at the bottom rear of supercharger 100. The configuration of the outlet port 110 may be as shown in FIG. 1 (and as also shown in FIG. 5C).

Rotors 104, 106 have spindles mounted for rotation in end plates 102i and 102o, with their axes of rotation shown as 104A and 106A. Inlet port 108, as shown in FIG. 5, has a left hand portion 108L that extends in an arc around axis 104A. Similarly, inlet port right hand portion 108R extends in an arc around axis 106A, but as portions of end plate 102i are removed in the drawing to depict internal elements, the full extent of inlet port portion 108R is not shown but is essentially symmetrical with the left hand portion 108L. The left and right hand portions of the inlet port 108 are joined along the upper portion of end plate 102i with an intermediate support 108S being provided for strength.

As will be shown in FIGS. 6-11, inlet port portions 108L and 108R may be extended arcuately in counterclockwise and clockwise directions respectively around axes 104A and 106A to increase the size of inlet port 108.

In FIG. 5, dashed lines 120 and 122 depict the mesh points (lines) between contacting lobes of adjoining rotors 104, 106. The volume of air between these rotor mesh points and the interior of the housing 102 is what is moved by the rotation of the rotors from inlet port 108 to outlet port 110. This volume of air will be sealed if the inlet and outlet ports and blowholes are closed off by the rotors. Leakage happens between meshed rotors: with respect to the volume of air fully trapped or contained between the housing and a rotor, the seal transfer time (sometimes shortened to "seal time") is the number of degrees of rotation before that contained volume of air meshes with the opposed rotor, and the dwell time is the number of degrees of rotation the inlet port is open to fill the cavity between the rotor and housing. As shown by the legends in FIG. 5, in a typical arrangement found in the prior art (using Eaton TVS 2650 rotors), the housing forming the inlet port 108 is configured so that there will be a nominal 10 degrees of seal transfer timing, i.e., after the inlet port is closed, a seal will remain for approximately 10 degrees of rotation before a leakage path occurs and the seal time period ends.

Referring to FIG. 5A, rotor 104 rotates around axis 104A and has 170 degrees of rotor twist, leaving 10 degrees of rotation for a transfer seal during which the volume of air will remain sealed. Another way to illustrate this is shown in FIGS. 5B and 5C, which show housing 102 and end plate 102i and inlet port 108 with left hand portion 108L and right hand portion 108R, with rotors 104 and 106 removed. Cusps 130a and 130b are the intersections of the cylindrical openings in housing 102 in which the rotors 104, 106 rotate. POINT #1 is taken as the point at one end of the housing at which a seal starts and POINT #2 is the point at the other end of the housing at which a seal ends, and as noted in the legend, POINT #1 and POINT #2 are 180 degrees apart in relation to the rotor lobes. As the rotors in this example have 170 degrees of twist, there will be 10 degrees of available seal time.

In determining seal times, there is one factor that cannot be changed and that is that the start and end sealing points in a machined housing are 180° apart (see FIG. 5C). The next factor, which can only be changed by changing the rotor design, is the amount of rotor twist. Eaton TVS2650 rotors are twisted 170°. This equates to 10° of rotation left for the rotors in the housing where the air volume traveling to the discharge port is fully sealed to the machined bore. If the rotor twist were 160°, then there would be a potential of 20° of rotation for sealing. Conversely if the rotor twist exceeded 180° there would never be a time where a single air volume was fully sealed to the machined housing. Housing and rotor design are two factors over which there exists little practical opportunity for control, as there exist good design reasons for keeping them as they are. With regards to the machined housing, once the rotor tip passes the sealing end point its volume becomes open to the adjacent rotor volume and leakage occurs.

The rotor properties and geometry are illustrated schematically in FIG. 5D, which represents the intersecting bores of the housing in which the rotors rotate as intersecting circles C1 and C2 with centers c1 and c2 that represent the axes around which the rotors rotate. The rotors rotate in the directions of the arrows and have the following properties:
 a. Rotor twist angle=$\phi_t$
 b. Rotor diameter=$D_r$
 c. Rotor spacing=Y
 d. Tip width angle (to recognize the finite width of a rotor lobe tip in sealing contact with the housing)=$\phi_w$
 e. Number of lobes=N
 f. Rotor bore intersection angle=$\phi_i$=$\cos^{-1}$ Y/D (angle measured counterclockwise from the line connecting centers c1 and c2)

To calculate the starting point of the inlet port (i.e., the angle of rotation at which inlet port opens to admit air to the space between rotors, measured counterclockwise from the line connecting centers c1 and c2), the maximum amount of seal time based on the rotor geometry, and the start point for the inlet port at zero seal time:
 a. Start point=$\Theta_m$=$\phi_i$+$\phi_t$
 b. Maximum amount of seal time (measured from the start point)=$\Theta_s$ $$\Theta_s=(360-2\phi_i)-(\phi_t+360/N)+\phi_w$$

c. It follows that the inlet port angle at zero seal time=$\Theta_d$=$\Theta_m$+$\Theta_s$ and if the inlet port angle is larger than this, then the seal time will be negative, and as will be described below it has been discovered that there are performance advantages to be obtained when the seal time is negative, and negative by significant amounts (for example, improvements were found at seal angles of from −10 to −40 degrees).

To apply these relationships to a practical example, the Eaton TVS2650 has the following properties:
 1. $D_r$=118.6 mm
 2. Y=80 mm
 3. $\phi_t$=170 degrees
 4. N=4
 5. $\phi_w$=1.9 degrees
And accordingly, in this example,
 6. $\phi_i$=47.58 degrees
 7. $\Theta_m$=217.58 degrees
 8. $\Theta_s$=6.74 degrees
 9. $\Theta_d$=224.32 degrees "Dwell" time or angle is the amount of rotor rotation during which the space or cavity between rotors is open to the inlet port. It is not until around 40° of inlet port dwell that the inlet port becomes open/connected to the discharge or outlet port. This is where prior art understanding would expect significant losses in performance at the top end (high rpm operation), but as will be explained below, our tests showed surprising results of enhanced performance, not losses.

With the two factors of housing and rotor design being essentially fixed as a practical matter, there is only one factor left that determines sealing and dwell time, and that is the inlet port size and shape. We have chosen to determine what would happen if we changed sealing and dwell times in 10° increments. We did this simply by machining the housing end plate to increase the size of the inlet port, and because the space between rotor lobes moves in an arcuate direction around the rotor axes, we increased the inlet ports by enlarging them in a similar arcuate direction. Because the housing end plate is also used to mount the shaft bearings for the rotors, it is necessary to maintain suitable support for the rotors while enlarging the inlet port. However, consistent with providing suitable support for the rotors, we anticipate that the inlet ports can be enlarged even beyond the sizes we tested to achieve superior performance. (See FIG. 11 and description of FIG. 11 below.)

One of skill in the art would understand from the foregoing explanation that you could increase the resolution of the tests, and for example, have increments of 5° of seal and 5° of dwell. Closing the inlet port (going in the opposite direction of what we tested) you can achieve, for example, 20° of seal and −10° of dwell. One of skill in the art would also recognize that all these numbers in this example relate to 170° twist rotors. Were this same analysis to be performed on Eaton TVS1900 and 2300 rotating groups, which have 160° twist rotors, the numbers would change accordingly.

Figure 6:
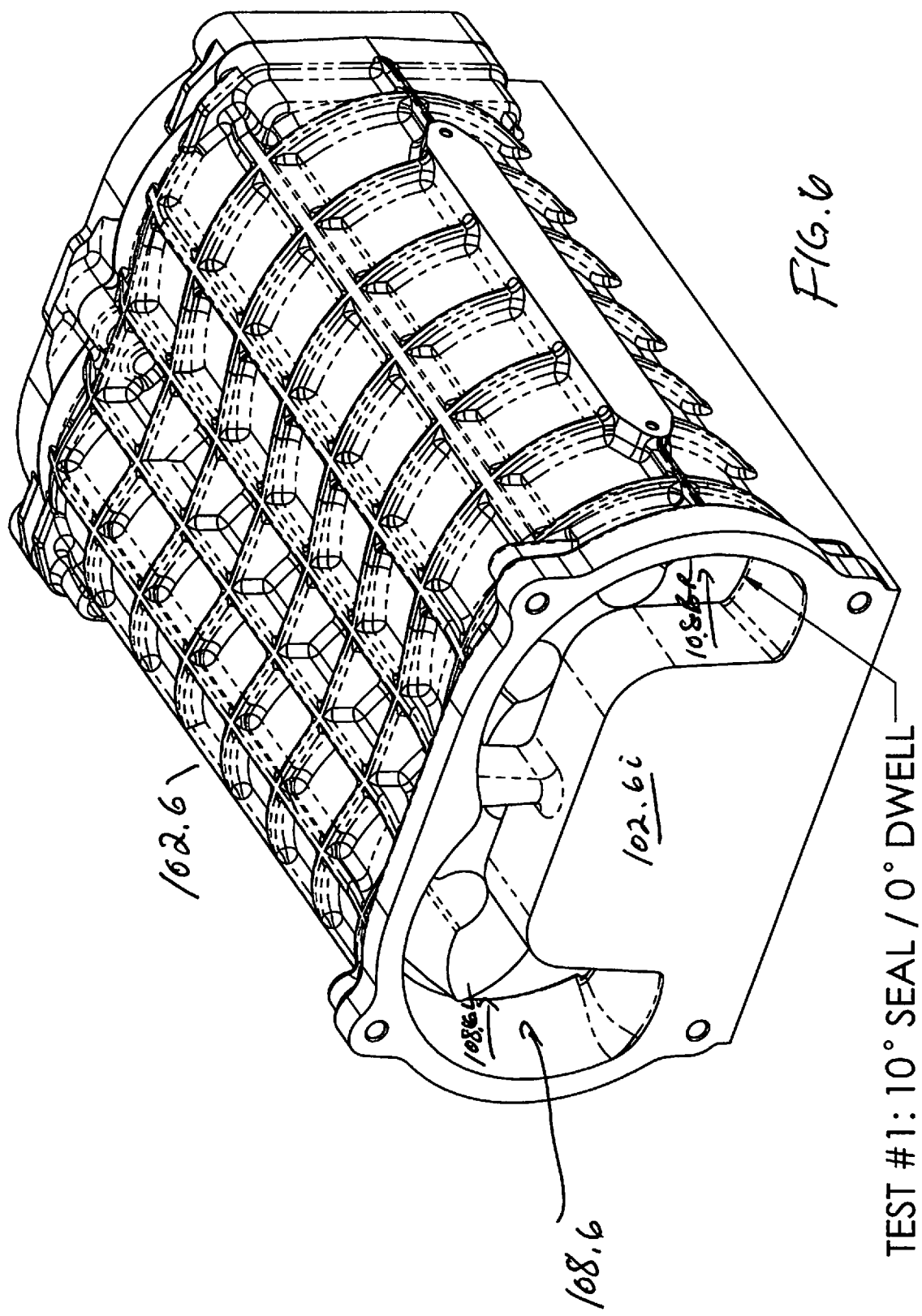
FIGS. 6-11 show perspective views similar to FIG. 5 in which seal timing angles are varied in ten degree increments from 10 degrees seal and 0 degrees dwell to −40 degrees seal and 50 degrees dwell according to the invention.
Figure 7:
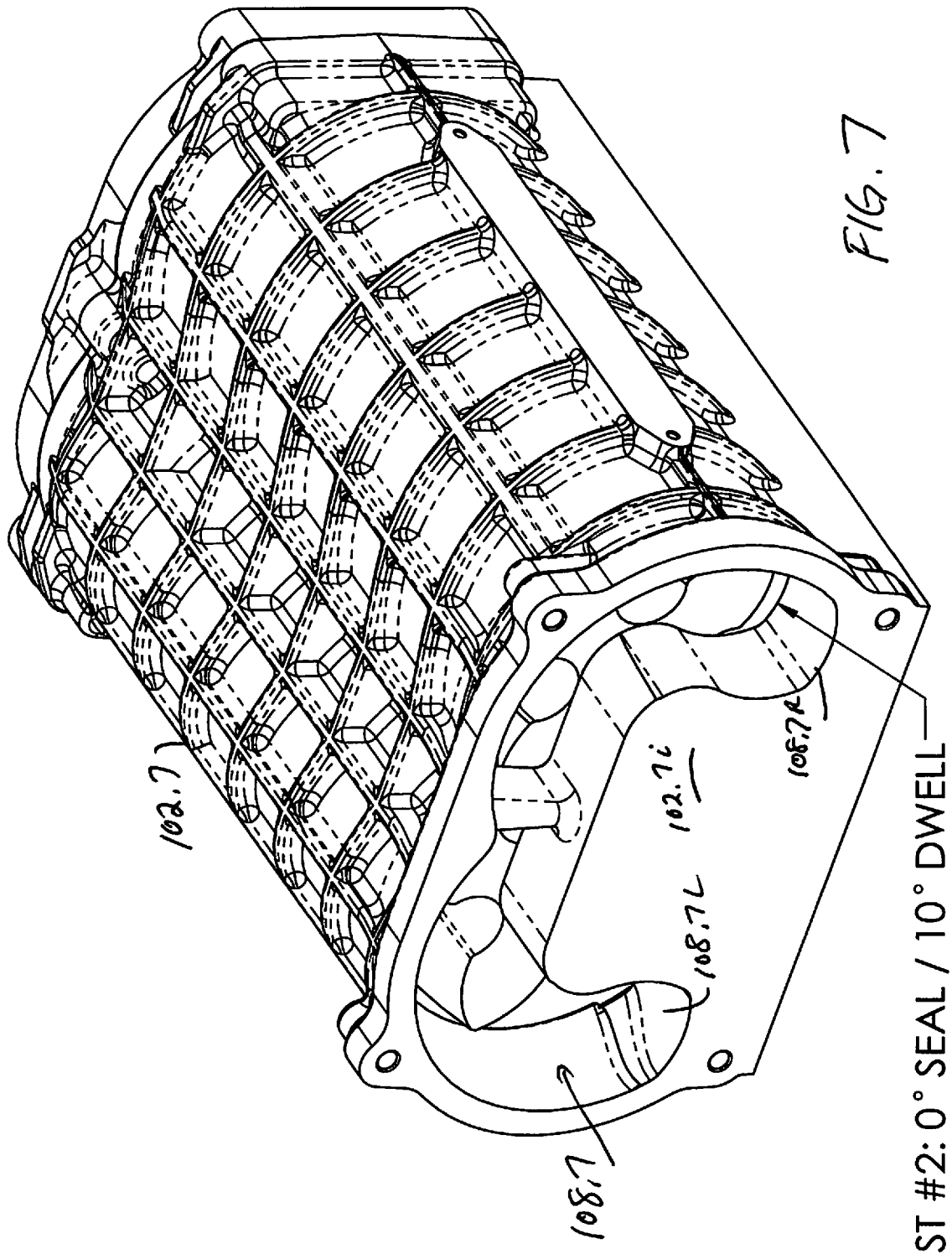
Figure 8:
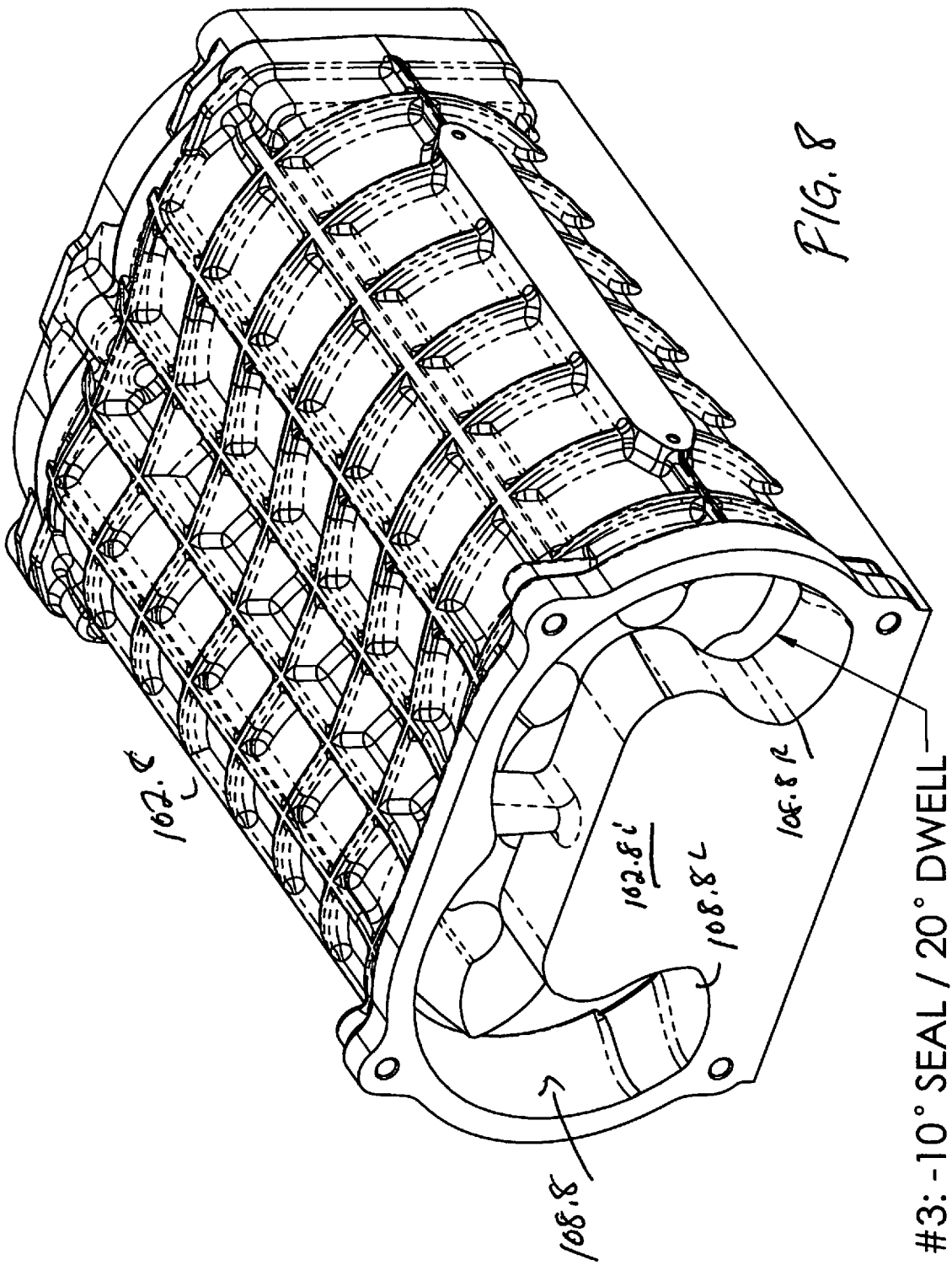
Figure 9:
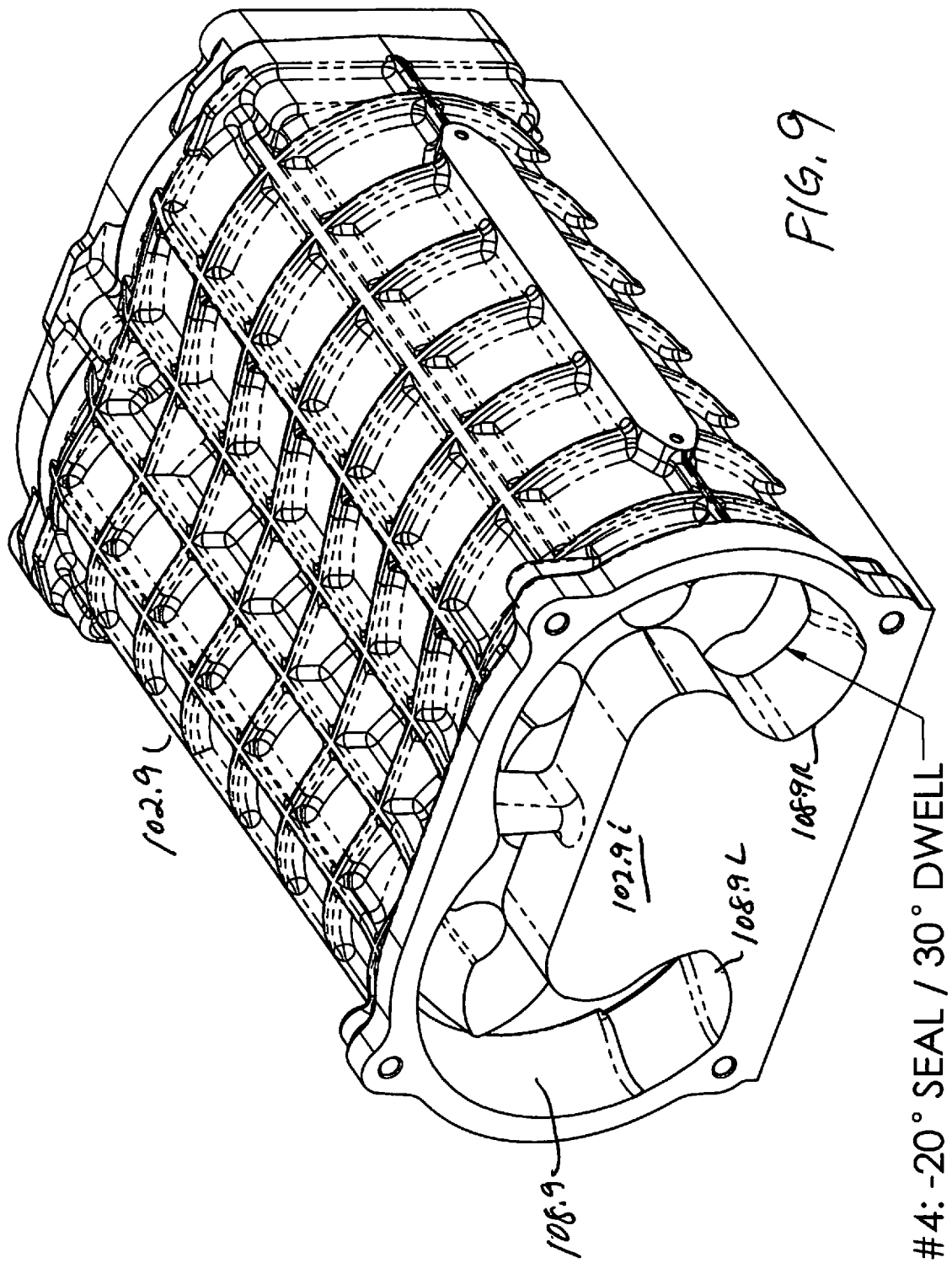
Figure 10:
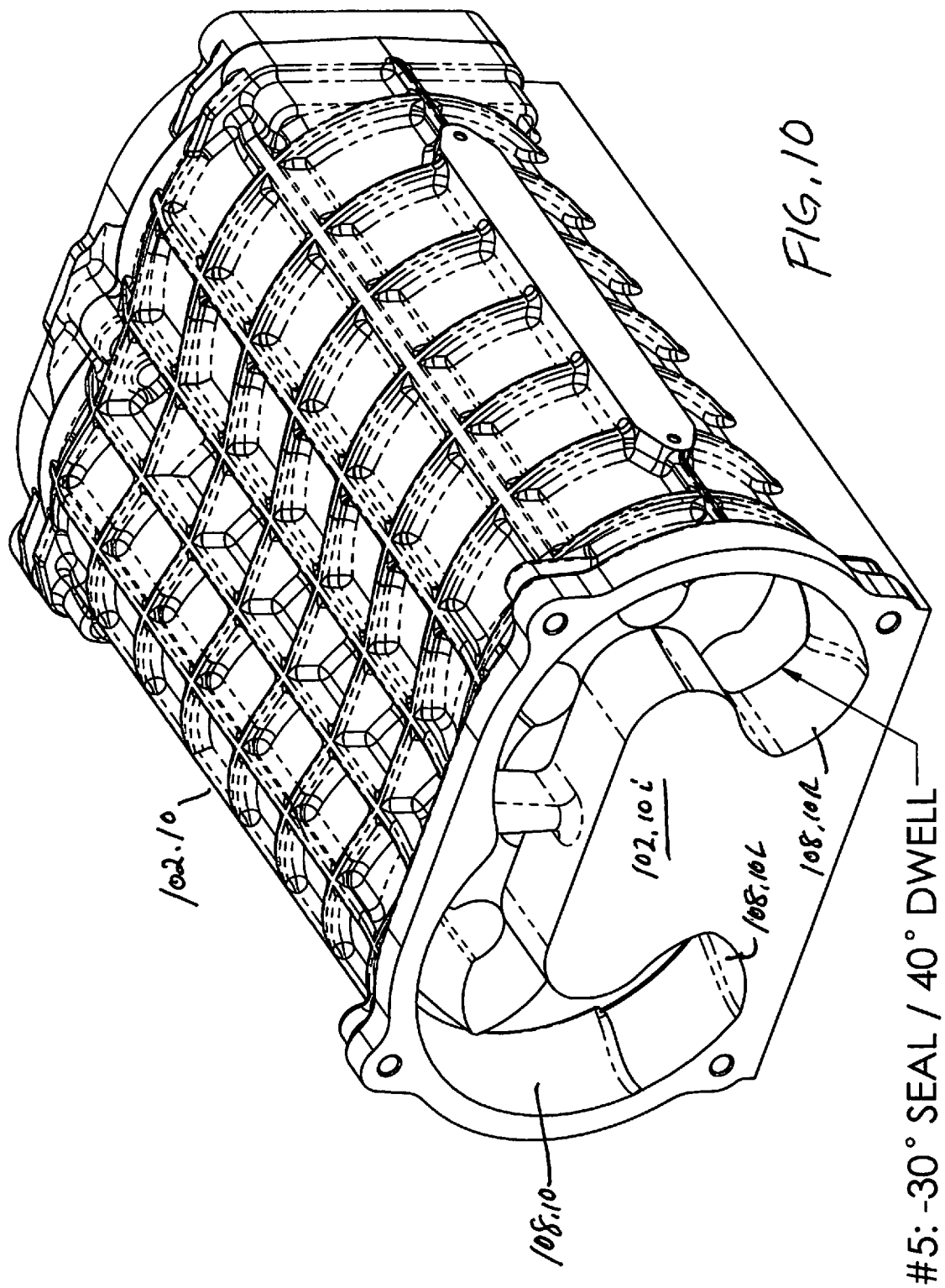
Figure 11:
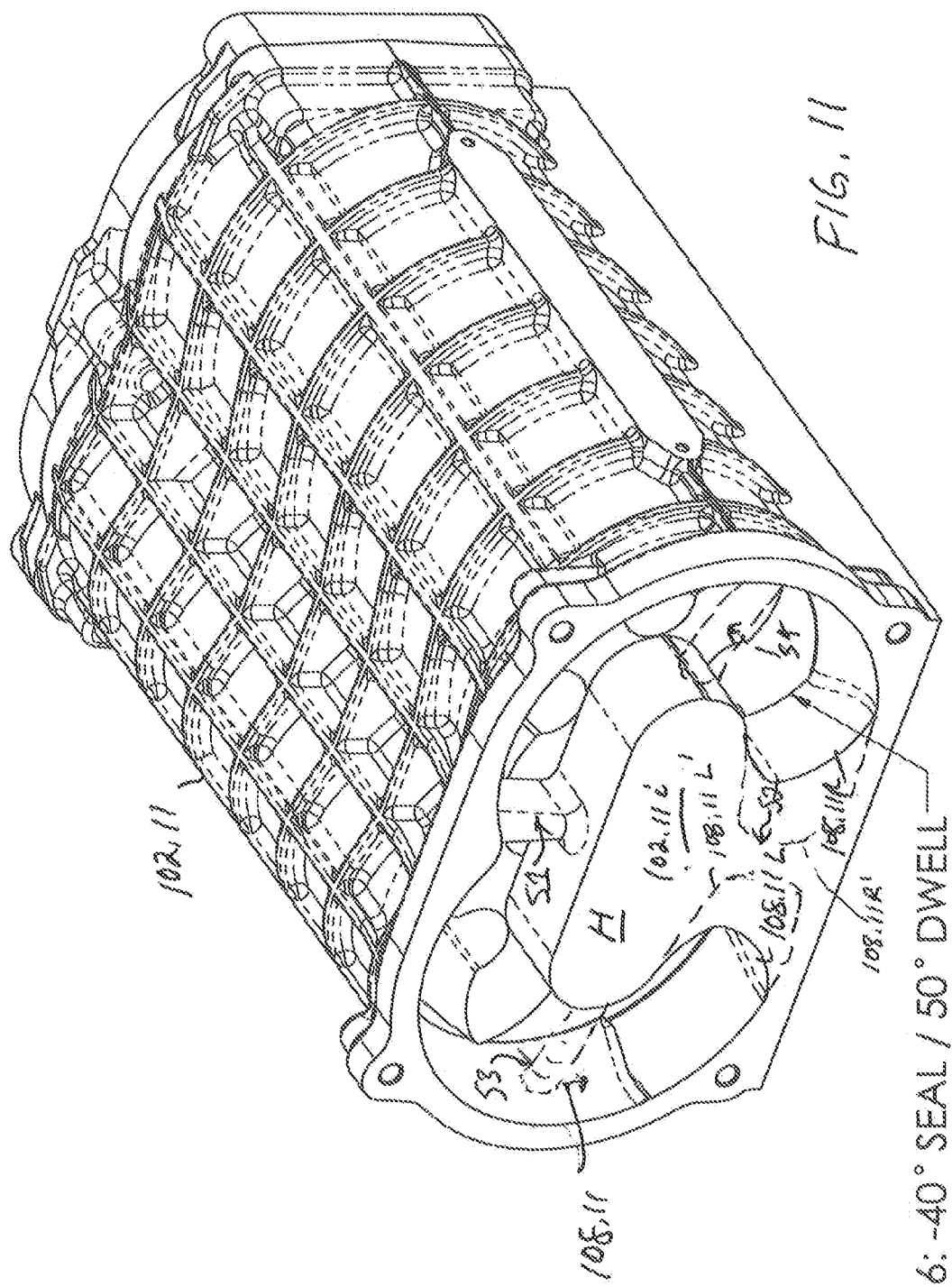

Referring now to FIGS. 6-11, a series of housings 102.6 through 102.11 are depicted with inlet ports 108.6 through 108.11 that are graduated in size by extending the left and right hand portions 108.6L through 108.11L and 108.6R through 108.11R of the inlet ports in an arcuate direction, to increase the area of the inlet ports 108.6 through 108.11, and to cause the seal timing to change in 10 degree increments from 10 degrees of seal timing in FIG. 6 (an unaltered inlet port) to −40 degrees of seal timing in FIG. 11.

Referring to FIG. 11, depicting −40 degrees of seal timing and 50 degrees dwell, even larger inlet ports 108.11L' and 108.11R', shown in dashed lines, extending to the maximum arcuate extent and providing the maximum available air flow into the rotors, similarly can be expected to produce enhanced performance characteristics. Inlet port size in this case is limited only by the need to provide support for the rotors, which as will be understood by those of skill in the art, can be provided by spokes or struts, such as the vertical struts S1 and S2, and horizontal struts S3 and S4, shown in FIG. 11 connecting the hub H in which the rotors are mounted to the exterior of the housing.

As the seal timing decreases in FIGS. 6-11, the dwell angle (during which the space between lobes is exposed to the inlet and outlet ports) increases. As will be understood by those of skill in the art, when the seal timing is negative, i.e., <0 degrees, a leakage path will occur. Generally the presence of a leakage path has been deemed in the prior art to be undesirable, because is it expected to cause performance to deteriorate.

Tests were performed on superchargers corresponding to those of FIGS. 6-11 to determine inlet flow rate, volumetric efficiency, and isentropic efficiency for pressure ratios (between inlet and outlet) of 1.6, 1.8 and 2.0. Results of these tests are shown in the graphs of FIGS. 12-20, with supercharger speeds in rpm along the x-axis and the variable being measured along the y-axis. In each graph, Port A corresponds to a seal angle of 10 degrees (TEST #1 of FIG. 6), Port B corresponds to a seal angle of 0 degrees (TEST #2 of FIG. 7), Port C corresponds to a seal angle of −10 degrees (TEST #3 of FIG. 8) and Port D corresponds to a seal angle of −20 degrees (TEST #4 of FIG. 9). Further tests of even larger inlet ports are expected to show similar results.

Figure 12:
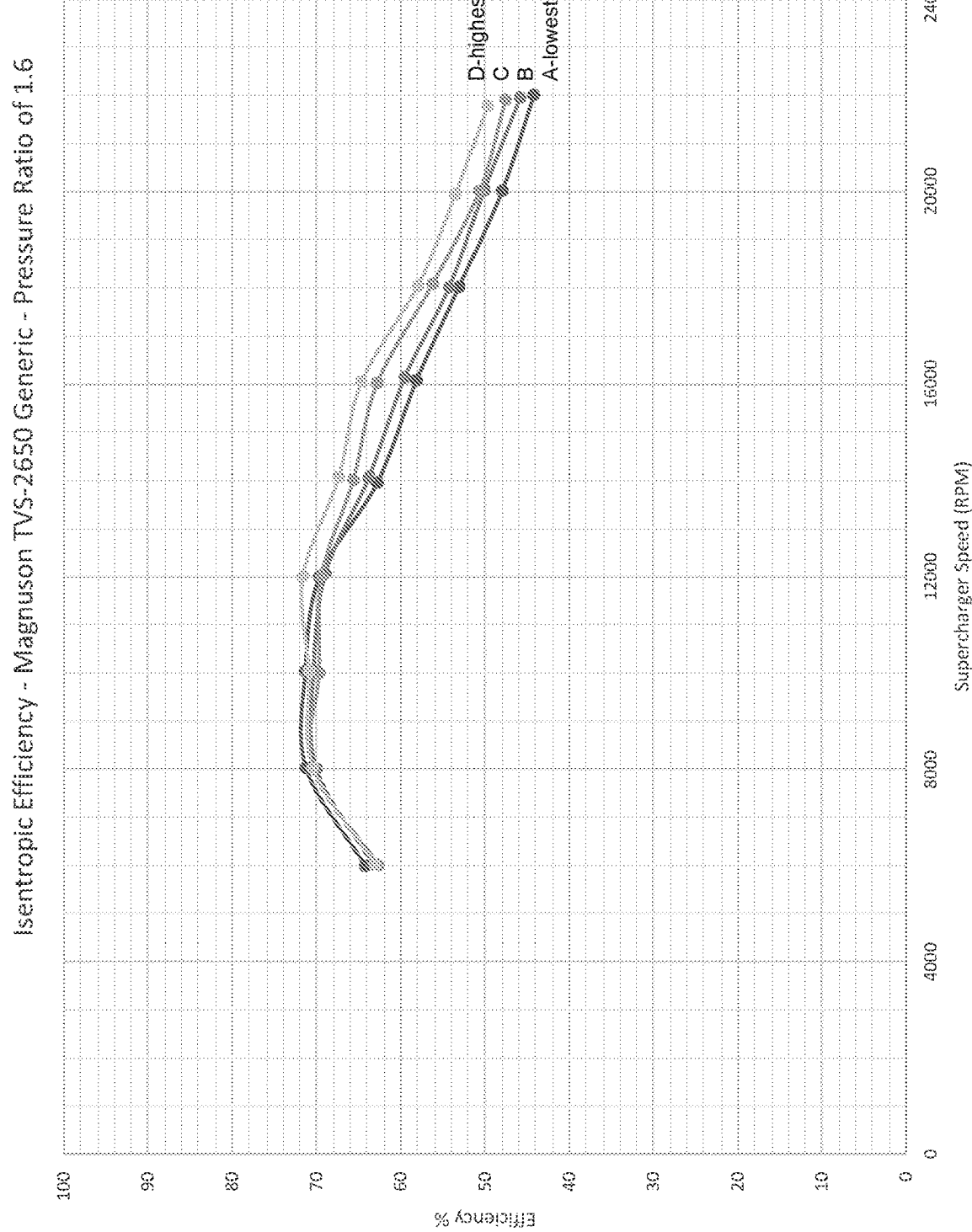
Figure 13:
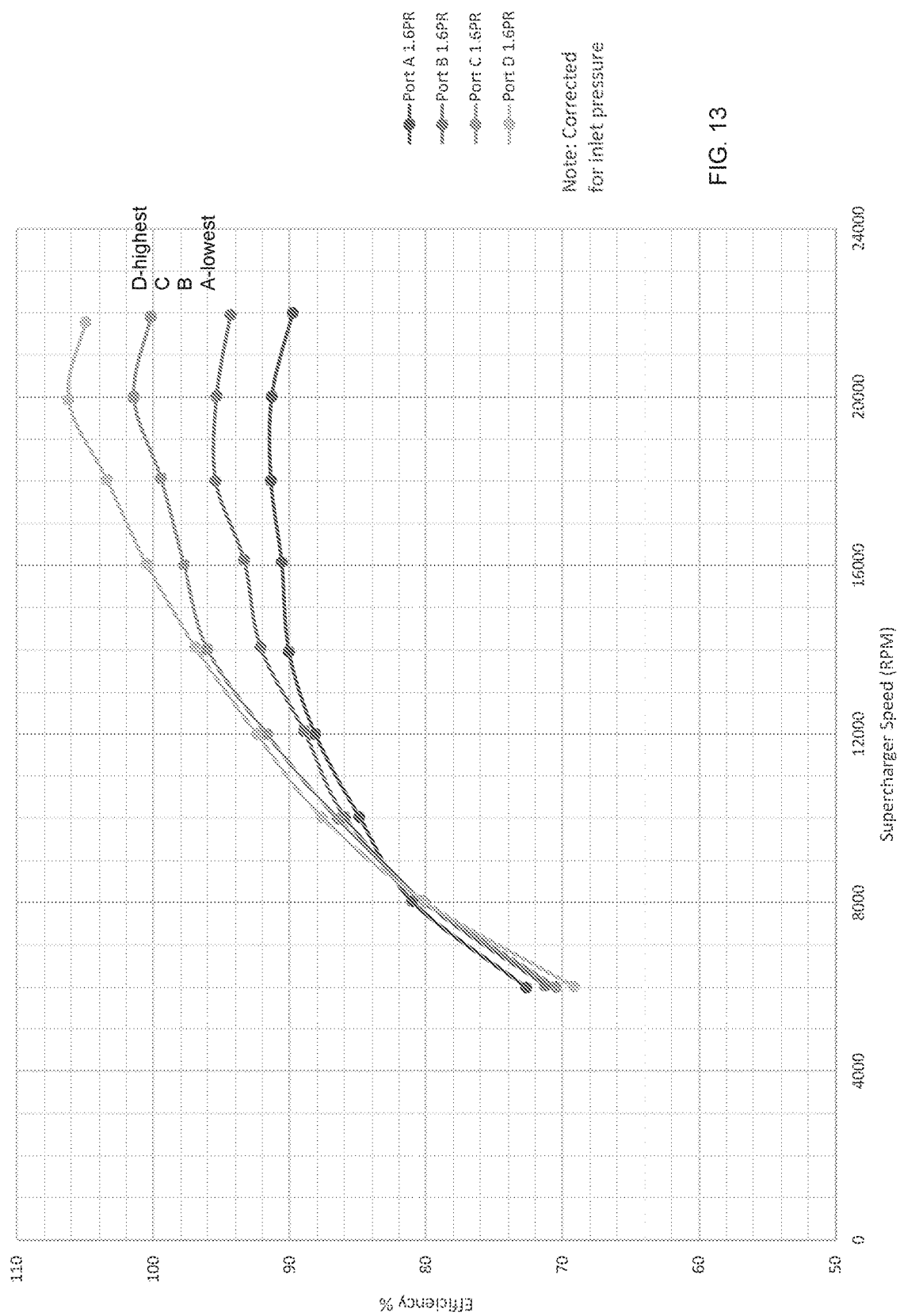
Figure 14:
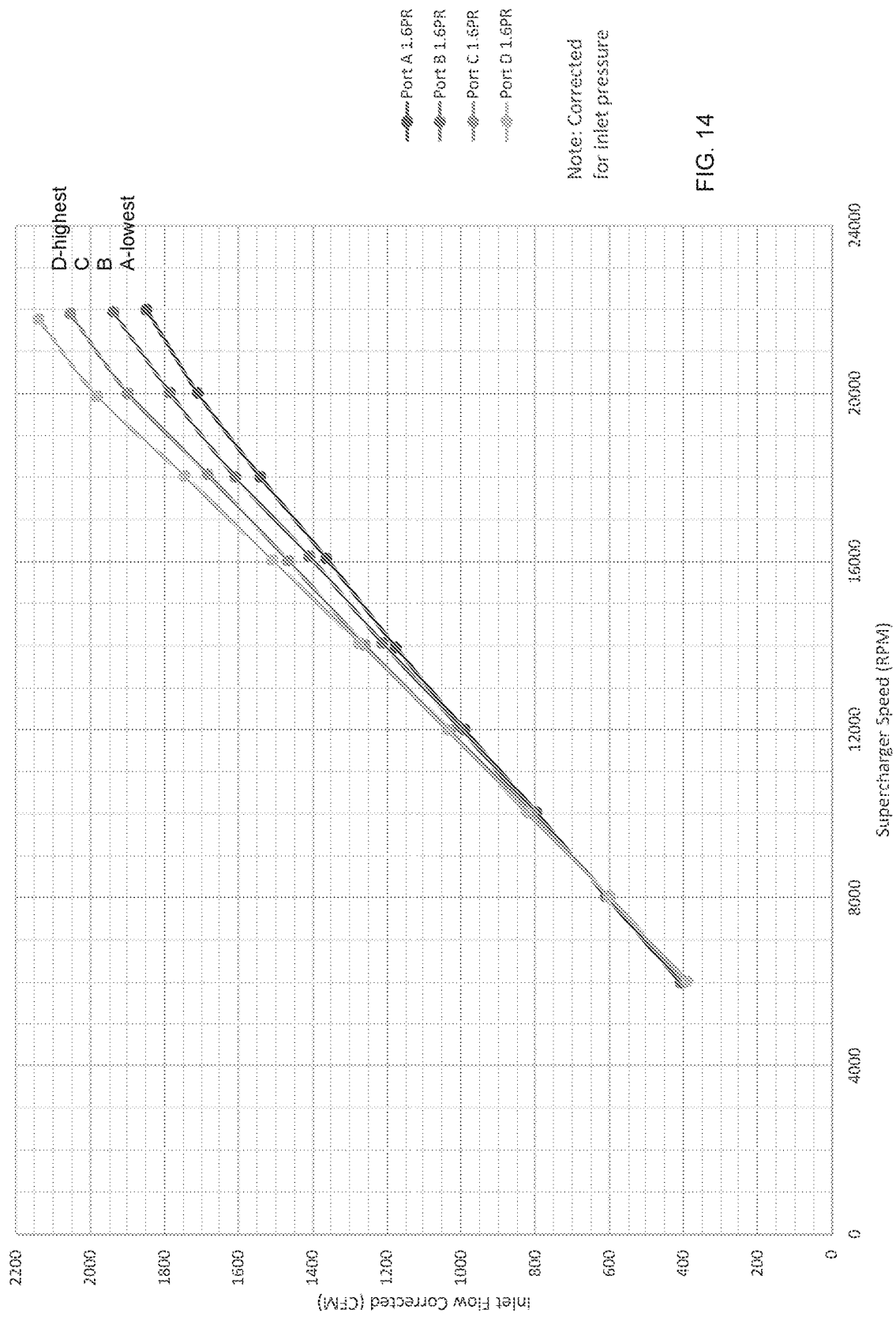

Unexpectedly, the test results showed supercharger performance to be enhanced with increasing negative seal angles. Referring to FIGS. 12-14 for example, showing results at a pressure ratio of 1.6, FIG. 12 shows higher rpm increases in inlet flow rate (which correspond to higher outlet flow rates and greater transfer of air to a combustion chamber for increased performance), with greater increases in inlet flow rate occurring for larger negative seal angles. At 22,000 rpm Port D has an inlet flow rate of about 2150 CFM versus 1850 for Port A, an increase of 300 CFM or about 16%. At the same time, at lower speeds of 6000-10,000 rpms, there was virtually no degradation of performance, which means that a substantial increase in high-end performance can be obtained without paying a low speed penalty.

FIG. 13 shows a similar increase in volumetric efficiency with greater increases at the high end for greater increases in negative seal angle. Low-end efficiency appears to be degraded by an amount that is far less than the increases in high-end efficiency. Similarly, FIG. 14 shows that isentropic efficiency at higher rpms is better with increasing negative seal angles, and does not suffer at lower rpms to a comparable degree. Significantly, all of the three measured parameters were improved at higher rpms with increasing negative seal angles, i.e., one improvement was not offset by deterioration in another measure. The improvements in flow rate and volumetric efficiency should be additive in terms of resulting supercharger performance, so it appears that by making a relatively simple alteration to a supercharger housing inlet it is possible to make substantial performance gains.

Figure 15:
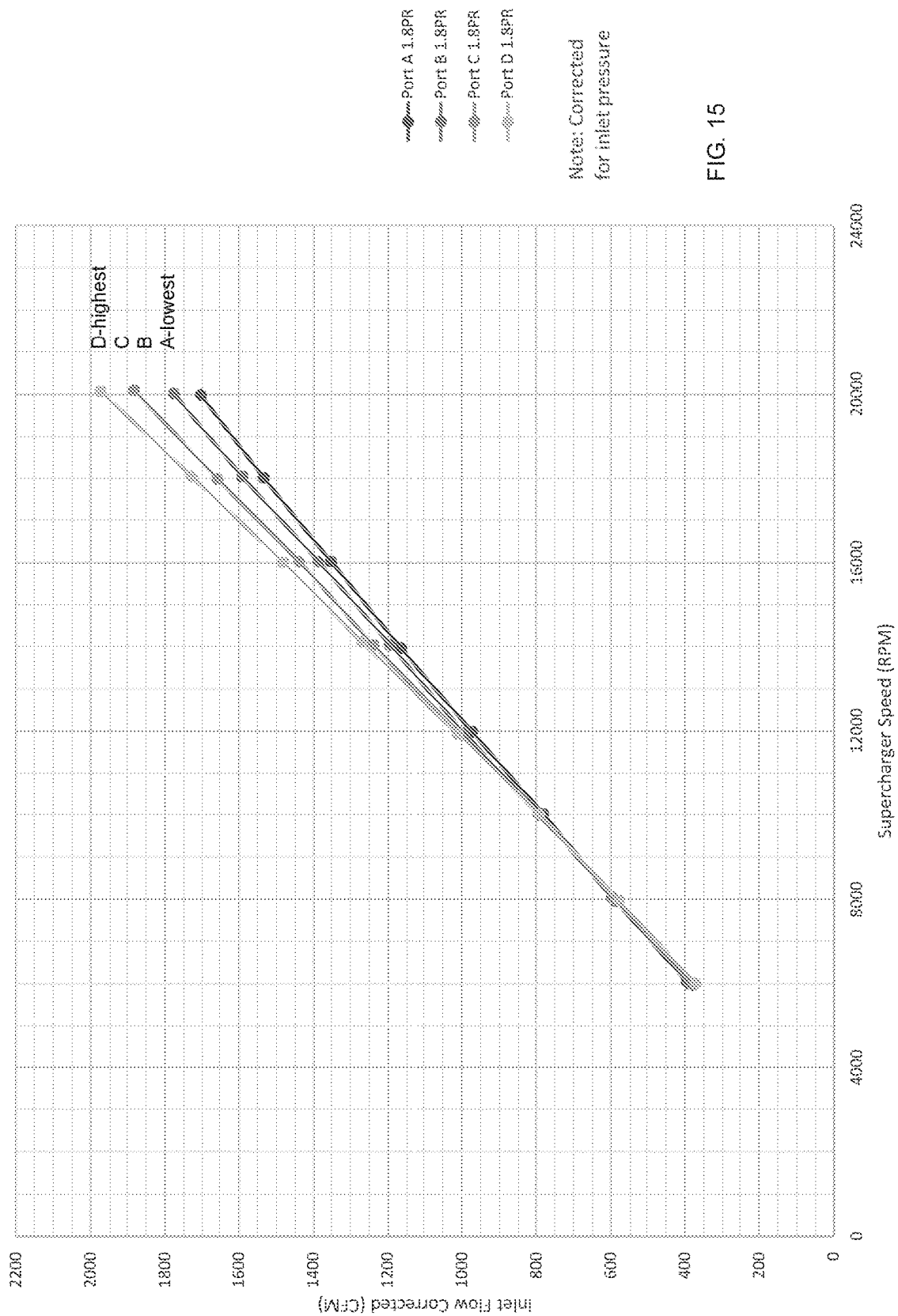
Figure 16:
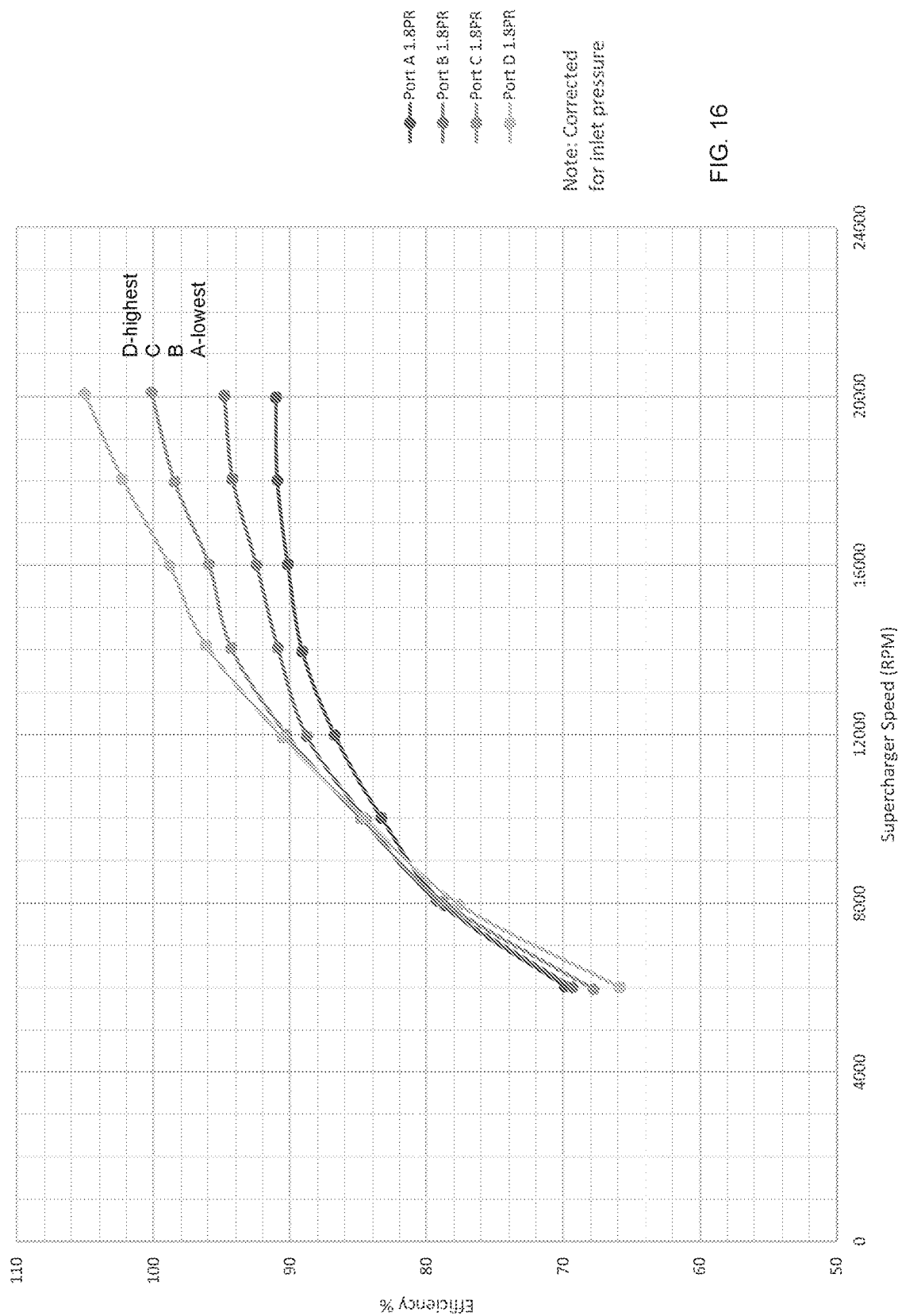
Figure 17:
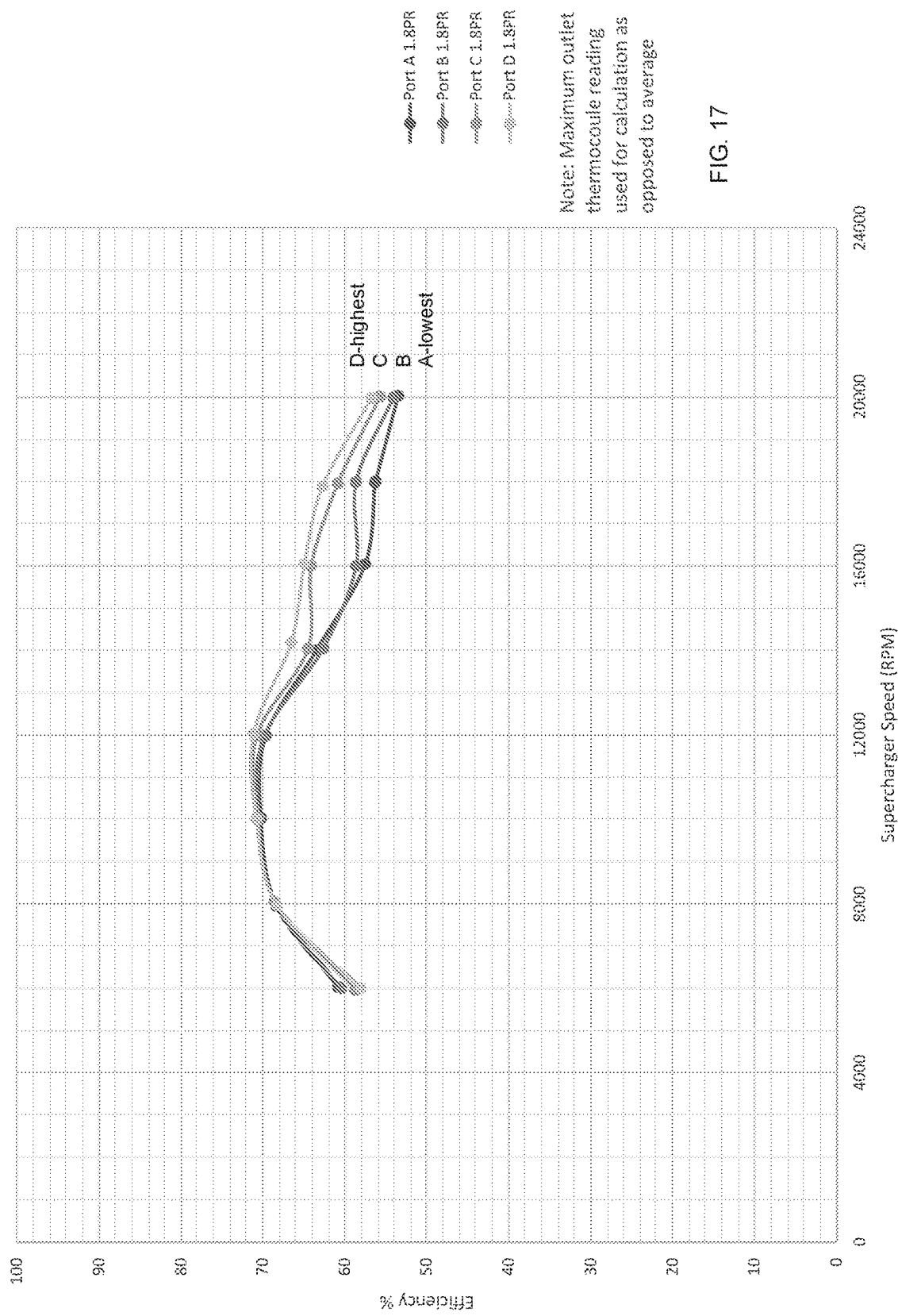
Figure 18:
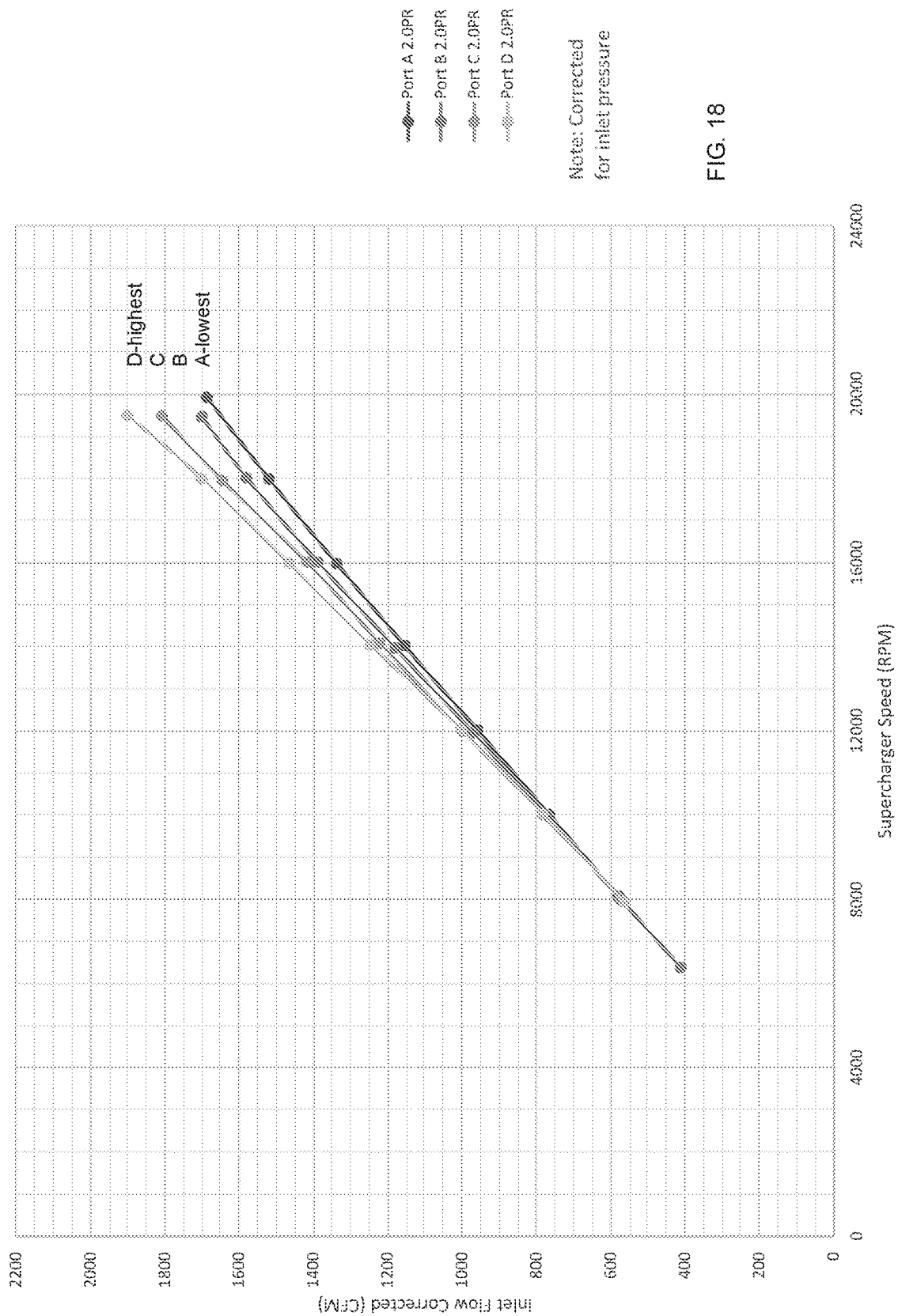
Figure 19:
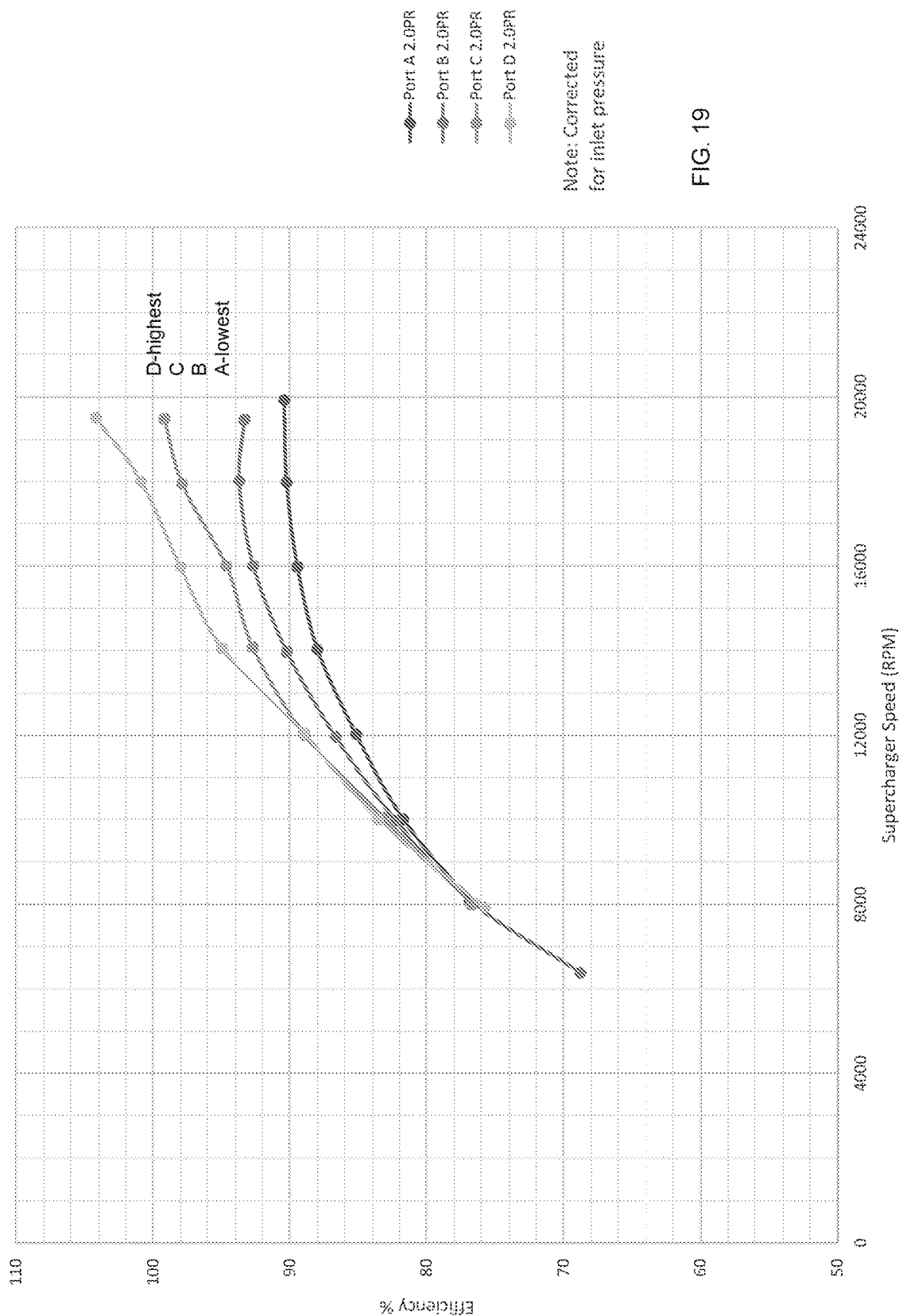

FIGS. 15-17 show test results for a pressure ratio of 1.8, and FIGS. 18-20 show test results for a pressure ratio of 2.0. As with the results for a pressure ratio of 1.6 shown in FIGS. 12-14, inlet flow rates, volumetric efficiency and isentropic efficiency all increased with increasing negative seal angles at higher rpms and smaller or no performance degradations at lower rpms.

While the present invention has been described with reference to preferred and exemplary embodiments, it will be understood by those of ordinary skill in the art that various changes may be made and equivalents may be substituted for elements thereof without departing from the scope of the invention. In addition, many modifications may be made to adapt a particular situation to the teachings of the invention without departing from the scope thereof. Therefore, it is intended that the invention not be limited to the particular embodiments disclosed, but that the invention include all embodiments falling within the scope of the appended claims.

What is claimed is:

1. A supercharger for supplying increased air flow to an engine, comprising twisted meshing rotors arranged to be coupled to the engine and rotated thereby, the rotors being mounted for rotation within a housing with the rotor outer surfaces in sealing contact with the housing and the rotor end surfaces in sealing contact with end walls of the housing, the housing having an inlet port to admit air between the meshing rotors during an angular portion of the rotor's rotation and an outlet port to expel air to the engine from the meshing rotors during another angular portion of the rotor's rotation, the rotors having mesh points where the rotors contact one another and spaces between the meshing rotors to accept a volume of air from the inlet port and propel it to the outlet port as the rotors are rotated and the mesh points travel axially from the inlet to the outlet, the housing, rotors and inlet port defining an angular portion of the rotors' rotation known as the seal transfer angle which is greater than or equal to zero degrees when the inlet port is closed and the volume of air between rotors is sealed and has no leakage path, wherein:

the housing, rotors and inlet port are configured to have a negative seal transfer angle that prevents the volume of air between rotors from being sealed and creates, for an angular portion of the rotors' rotation, an air leakage path through the inlet port and the space between rotors, for improved supercharger performance.

2. The supercharger as claimed in claim 1 wherein:

the inlet port is configured to have an opening size that is equal to or greater than the size of an inlet port that would produce a negative 10 degree seal transfer angle with the rotors.

3. The supercharger as claimed in claim 2 wherein the rotors rotate in the housing about axes, and the inlet port has an arcuate configuration around the axis of at least one rotor and extends a sufficient arcuate extent to produce a negative sealing angle.

4. The supercharger as claimed in claim 3 wherein the inlet port has an arcuate configuration around both axes of the rotors.

5. The supercharger as claimed in claim 3 wherein:
the inlet port is configured to extend its arcuate extent by machining the end wall of the housing in which the inlet port appears.

6. The supercharger as claimed in claim 3 wherein:
the rotors and inlet port are configured to produce a negative sealing angle of at least 10 degrees.

7. The supercharger as claimed in claim 1 wherein:
the housing, rotors and inlet port are configured to produce a negative sealing angle of at least 20 degrees.

8. The supercharger as claimed in claim 1 wherein:
the housing, rotors and inlet port are configured to produce a negative sealing angle of between 40 degrees and the maximum negative sealing angle available.

9. The supercharger as claimed in claim 1 wherein:
the housing, rotors and inlet port are configured to produce a negative sealing angle that is between 10 and 40 degrees.

10. The supercharger as claimed in claim 1 wherein:
the housing, rotors and inlet port are configured to provide a negative sealing angle that produces the maximum inlet port opening for air to flow into the supercharger.

11. The supercharger as claimed in claim 1 wherein:
the rotors are mounted for rotation in a hub,
the hub is connected to the housing by struts that support the hub, and
the hub, struts, rotors and inlet port are configured to provide a negative sealing angle that produces the maximum inlet port opening for air to flow into the supercharger.

12. A method for operating a supercharger mounted on an engine for supplying increased air flow to the engine, the supercharger having twisted meshing rotors arranged to be coupled to the engine and rotated thereby, the rotors being mounted for rotation within a housing with the rotor outer surfaces in sealing contact with the housing and the rotor ends in sealing contact with end walls of the housing, the housing having an inlet port to admit air between the meshing rotors and an outlet port to expel air from the meshing rotors, the rotors having mesh points where the rotors contact one another and spaces between their mesh points to accept air from the inlet port and propel it to the outlet port as the rotors are rotated and the mesh points travel axially from the inlet to the outlet, the rotors and inlet and outlet ports defining an angular portion of the rotors' rotation known as the seal transfer angle which is greater than or equal to zero degrees when the inlet port is closed and the volume of air between rotors is sealed and has no leakage path, comprising:

providing an inlet port with a size increased beyond the size of an inlet port that would produce a zero seal transfer angle and thereby prevents the volume of air between rotors from being sealed and creates, for an angular portion of the rotors' rotation, an air leakage path, and using the engine to rotate the rotors to provide air flow to the engine through the supercharger that is increased over the air flow provided by an inlet port that would produce a zero sealing angle thereby producing improved high speed performance without degrading low speed performance.

13. The method for operating a supercharger as claimed in claim 12 wherein the inlet port is provided with a size increased beyond the size of an inlet port that would produce a negative seal transfer angle of at least five degrees.

14. The method for operating a supercharger as claimed in claim 12 wherein the inlet port is provided with a size increased beyond the size of an inlet port that would produce a negative seal transfer angle of at least twenty degrees.

15. The method for operating a supercharger as claimed in claim 12 wherein the inlet port is provided with a size increased beyond the size of an inlet port that would produce a seal transfer angle of at least negative thirty degrees.

16. The method for operating a supercharger as claimed in claim 12 wherein the inlet port is provided with a size increased beyond the size of an inlet port that would produce a negative seal transfer angle of between forty degrees and the maximum negative sealing angle available.

17. A roots-type supercharger for supplying increased air flow to an engine with twisted meshing rotors arranged to be coupled to the engine and rotated thereby and an inlet port to admit a volume of air to the space between rotors, the inlet port and rotors providing a negative seal transfer angle that prevents the volume of air between rotors from being sealed and creates, for an angular portion of the rotors' rotation, an air leakage path through the inlet port and the space between rotors for improved supercharger performance.

18. The roots-type supercharger as claimed in claim 17 wherein the negative seal transfer angle is at least negative 20 degrees.

19. The roots-type supercharger as claimed in claim 17 wherein the negative seal transfer angle is at least negative 40 degrees.

20. The roots-type supercharger as claimed in claim 17 wherein the negative seal transfer angle is between negative 40 degrees and the maximum negative seal transfer angle available.

* * * * *